(12) United States Patent
Fujimoto et al.

(10) Patent No.: US 10,370,038 B2
(45) Date of Patent: Aug. 6, 2019

(54) WORK VEHICLE

(71) Applicant: Kubota Corporation, Osaka-shi (JP)

(72) Inventors: Hiroo Fujimoto, Sakai (JP); Masatoshi Watanabe, Sakai (JP); Takahiro Hisada, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 14/893,663

(22) PCT Filed: Mar. 23, 2015

(86) PCT No.: PCT/JP2015/058715
§ 371 (c)(1),
(2) Date: Nov. 24, 2015

(87) PCT Pub. No.: WO2015/146901
PCT Pub. Date: Oct. 1, 2015

(65) Prior Publication Data
US 2016/0288843 A1 Oct. 6, 2016

(30) Foreign Application Priority Data

Mar. 28, 2014 (JP) .................................. 2014-069069
Mar. 28, 2014 (JP) .................................. 2014-069071

(51) Int. Cl.
B62D 25/16 (2006.01)
F16F 15/02 (2006.01)
(Continued)

(52) U.S. Cl.
CPC ............. B62D 25/168 (2013.01); B60D 1/02 (2013.01); B60D 1/246 (2013.01); B60D 1/465 (2013.01);
(Continued)

(58) Field of Classification Search
CPC .... B62D 25/168; B62D 25/163; B62D 25/20; B60D 1/02; B60D 1/246; B60D 1/465; F16F 15/02
(Continued)

(56) References Cited

U.S. PATENT DOCUMENTS 3,879,059 A * 4/1975 Gibes .................. B62D 25/168
280/848
2008/0029989 A1* 2/2008 Griffiths ............... B62D 25/163
280/154
2011/0172892 A1 7/2011 Matsuzaki et al.

FOREIGN PATENT DOCUMENTS

JP S3818251 9/1963
JP H2 65625 U 5/1990
(Continued)

OTHER PUBLICATIONS

IPRP for PCT/JP2015/058715 dated Oct. 13, 2016. English-language translation attached.

Primary Examiner — Joseph D. Pape
Assistant Examiner — Dana D Ivey
(74) Attorney, Agent, or Firm — The Webb Law Firm

(57) ABSTRACT

Contemplated are cost reduction and enhanced readiness of parts management related to right and left fenders. A work vehicle includes right and left fenders (16) each having a vertical plate member (18) covering an inner face of a traveling device from an inner side of a vehicle body and a top plate member (19) covering an upper portion of the traveling device (5) from above, wherein the top plate member (19) is configured to be front-rear symmetric, and each of the vertical plate member (18) and the top plate member (19) is configured to act as a right-left interchangeable member.

11 Claims, 15 Drawing Sheets

(51) Int. Cl.
*B62D 25/20* (2006.01)
*B60D 1/02* (2006.01)
*B60D 1/24* (2006.01)
*B60D 1/46* (2006.01)
*A01B 59/043* (2006.01)
*A01B 59/06* (2006.01)
*B60D 1/00* (2006.01)
*B62D 49/06* (2006.01)
*F16H 59/02* (2006.01)

(52) U.S. Cl.
CPC ........... *B62D 25/163* (2013.01); *B62D 25/20* (2013.01); *F16F 15/02* (2013.01); *A01B 59/043* (2013.01); *A01B 59/066* (2013.01); *B60D 1/00* (2013.01); *B62D 49/06* (2013.01); *F16H 59/0278* (2013.01)

(58) Field of Classification Search
USPC ....................................................... 296/198
See application file for complete search history.

(56) References Cited

FOREIGN PATENT DOCUMENTS

| | | | |
|---|---|---|---|
| JP | 5 58345 | A | 3/1993 |
| JP | 2002 264841 | A | 9/2002 |
| JP | 2004 74917 | A | 3/2004 |
| JP | 2011 143801 | A | 7/2011 |
| JP | 2011243165 | A | 12/2011 |
| JP | 2012 96735 | A | 5/2012 |
| JP | 2014 15058 | A | 1/2014 |

\* cited by examiner

WORK VEHICLE

CROSS-REFERENCE TO RELATED APPLICATIONS

This application is the United States national phase of International Application No. PCT/JP2015/058715 filed Mar. 23, 2015, and claims priority to Japanese Patent Application Nos. 2014-069069 and 2014-069071, both filed Mar. 28, 2014, the disclosures of which are hereby incorporated in their entirety by reference.

TECHNICAL FIELD OF THE INVENTION

The present invention relates to a work vehicle including right and left fenders, each of the fenders having a vertical plate member that covers an inner face of a traveling device from an inner side of a vehicle body, and a top plate member that covers an upper portion of the traveling device from above.

The present invention relates to a work vehicle such as a tractor, a riding grass mower, a riding rice planter, and a wheel loader, etc.

BACKGROUND OF THE INVENTION

In a work vehicle as described above, a vertical plate member (an erect wall-like attaching plate 1) and a top plate member (a circumference covering body 2) projecting outwards in a direction perpendicular to the vertical plate member are provided, and the top plate member is disposed longitudinally along a front-rear direction. On the inner and outer sides of the top plate member, there are provided right and left attaching tongue portions 5, 6 having a same shape. One of these right and left attaching tongue portions 5, 6 is attached to the vertical plate member. With these, there are constituted right and left fenders 3, 4 which are configured to be right-left symmetric (see e.g. Patent Document 1).

As a tractor as an example of the work vehicle, there is known a tractor configured such that at right and left opposed areas in foot-rest regions formed by boarding steps, there are disposed operational pedals such as a brake pedal, a clutch pedal (a stopping pedal), etc. in distribution (see e.g. Patent Document 2).

PRIOR ART DOCUMENTS

Patent Documents

Patent Document 1: Japanese Unexamined Patent Application Publication No. "Heisei" 05-58345 (JP H05-58345 A)
Patent Document 2: Japanese Unexamined Patent Application Publication No. 2011-143801 (JP 2011-143801 A) (paragraph [0014], FIG. 2).

SUMMARY OF THE INVENTION

Problem to be Solved by Invention

With the configuration disclosed in Patent Document 1, the top plates of the right and left fenders can be configured to act as right-left interchangeable members which have right-left symmetric shape. With this, thanks to the right-left interchangeability of the top plate members, cost reduction and enhancement of readiness of parts management are made possible.

However, since the vertical plate members are for either right or left side use only, there remains room for improvement in realizing further cost reduction and parts management readiness for the right and left fenders.

That is, there is a need for realization of further cost reduction and parts management readiness respecting right and left fenders.

In the case of the configuration disclosed in Patent Document 2, the footrest regions formed by boarding steps are limited by the presence of the various kinds of operational pedals, which makes it difficult to place a foot on the boarding step. For this reason, in the case also e.g. of a constant-speed traveling in which there is no need for step-on operation of the brake pedal or the clutch pedal, driving will often be implemented with a foot kept placed on an operational pedal at its step-on releasing position. And, in such case, due to violent swaying of the vehicle body during traveling, it sometimes happens that a step-on operation, though of a small amount, may be effected inadvertently. Thus, transmission loss, unnecessary frictional wear of a friction disc of the clutch or brake tends to be invited by such step-on operation.

Further, in case a foot is placed on the boarding step, when a step-on switchover motion is effected for moving the foot from the boarding step to an operational pedal as a preliminary motion for a step-on operation of the operational pedal, the foot can easily come into contact with the operational pedal, so such step-on switchover motion was difficult.

That is, it is desired to make it possible to keep a foot away from an operational pedal during e.g. a constant-speed traveling requiring no pedal operation and also to facilitate a step-on switchover motion to an operational pedal.

Solution to the Problem

According to a first solution:
a work vehicle includes right and left fenders, each of the fenders having a vertical plate member that covers an inner face of a traveling device from an inner side of a vehicle body, and a top plate member that covers an upper portion of the traveling device from above;
wherein the top plate member is configured to be front-rear symmetric, and each of the vertical plate member and the top plate member is configured to act as a right-left interchangeable member.

With the above solution, the right and left fenders can be configured by providing two right-left interchangeable top plate members which are front-rear symmetric so that these top plate members can be used in inversion between the front side and the rear side and providing also two vertical plate members which are interchangeable between the right side and the left side and connecting the respective top plate member with vertical plate member corresponding to each other.

Therefore, as compared with a case of configuring both or one of the vertical plate member and the top plate member of the right and left fenders as member(s) for either right or left side use alone, through right-left interchangeability of each mold for the vertical plate member and the top plate member, cost reduction is made possible. And, through right-left interchangeability of the vertical plate member and the top plate member, parts management can be facilitated.

As a solution for accomplishing the first object more preferably, the vertical plate member has a front-rear symmetric shape.

With this solution, by providing two right-left interchangeable top plate members which are front-rear symmetric so that these top plate members can be used in inversion between the front side and the rear side and providing also two vertical plate members which are interchangeable between the right side and the left side and connecting the vertical plate member to one right/left side portion of each top plate member, there can be provided right-left interchangeable fenders which can be used in inversion between the front side and the rear side.

Therefore, the fender constituted by connecting the top plate member with the vertical plate member can also be configured to act as a right-left interchangeable member. With this, the parts management can be further facilitated.

As a further solution for accomplishing the first object more preferably, the vertical plate member has a right-left symmetric shape.

With this solution, by providing two right-left interchangeable top plate members which are front-rear symmetric so that these top plate members can be used in inversion between the front side and the rear side and providing also two vertical plate members which are right-left symmetric so that these vertical plate members can be used on the right and left sides under a predetermined front-rear posture and connecting one vertical plate member to one right/left side portion of one top plate member and connecting the other vertical plate member to the other right/left side portion of the other top plate member, fenders dedicated for the left side or right use can be configured.

Therefore, through the right-left interchangeability of each mold for the vertical plate member and the top plate member, cost reduction is made possible. And, through the right-left interchangeability of the vertical plate member and the top plate member, the parts management can be further facilitated. And, at the same time, the resultant right and left fenders have greater freedom of shape which allows the vertical plate member for covering the inner face of the travel device from the inner side of the vehicle body to have a front-rear asymmetric shape.

As a further solution for accomplishing the first object more preferably:

each of the right and left fenders includes a front side cover member for covering a front side of the traveling device; and the front side cover member is configured to act as a right-left interchangeable member having a vertically symmetric shape.

With this solution, with the provision of the right-left interchangeable front side cover member which can be used in vertical inversion due to its vertically symmetric shape, through the right-left interchangeability of each mold for the front side cover member, cost reduction is made possible. And, through the right-left interchangeability of the front side cover member, the parts management can be further facilitated. And, at the same time, it is also possible to prevent scattering of mud or the like splashed by the traveling device to the front side.

As a further solution for accomplishing the first object more preferably:

the work vehicle further comprises: a support bracket for supporting the vertical plate member, the support bracket being a right-left interchangeable member having a front-rear symmetric shape.

With this solution, with the provision of the right-left interchangeable support bracket which can be used in inversion between the front side an the rear side due to its front-rear symmetric shape, through the right-left interchangeability of the mold for the support bracket, cost reduction is made possible. And, through the right-left interchangeability of the support bracket, the parts management can be further facilitated.

As a further solution for accomplishing the first object more preferably:

the support bracket includes, in front-rear symmetric layout, a left connecting portion for disposing the vertical plate member with an offset to one front/rear side relative to a front-rear center of the support bracket, and a right connecting portion for disposing the vertical plate member with an offset to the other front/rear side relative to the front-rear center of the support bracket.

With this solution, the right and left fenders can be connected to the right and left support brackets, with disposing the vertical plate member with an offset to one front/rear side relative to the front-rear center of the right and left brackets. That is, the right and left fenders can be disposed at position offset rearwards relative to the front-rear center of the right and left support brackets.

With the above, the top plate member for covering the upper portion of the traveling device from above is configured to act as a right-left interchangeable member having a front-rear symmetric shape that allows its use in front-rear inversion, and at the same time, the extending length of the top plate member to the rear side relative to the traveling device can be increased, without increasing the front-rear length of the top plate member more than necessary, so that mud or the like violently splashed to the rear side by the traveling device at the time of forward traveling when high-speed traveling is possible can be received by the top plate member in a more reliable manner.

As a result, while cost reduction is made possible by the reduction of the front-rear length of the top plate member, scattering of mud or the like splashed up to the rear side by the traveling device can be effectively restricted.

As a further solution for accomplishing the first object more preferably:

the top plate member includes a connecting arm to be connected to the support bracket; and the vertical plate member and the connecting arm are connected and fastened together to the support bracket.

With this solution, compared with a case of connecting the vertical plate member and the connecting arm individually to the support bracket, readiness of assembly can be improved.

According to a solution for accomplishing a second object:

a work vehicle comprising:

a steering frame disposed erect at a position in a vehicle body frame which position is forwardly of a driver's seat; and a lower cover to be attached to the steering frame for covering the steering frame from behind;

wherein the lower cover including a footrest member to be used by a driver seated in the driver's seat.

With this solution, at the time of e.g. constant-speed traveling which requires no step-on operation on an operational pedal such as a brake pedal or a clutch pedal, it is possible to place both feet in a stable manner on the footrest members which are included in the lower cover to be located upwardly of the boarding steps.

With the above, at the time of a constant-speed traveling for instance, there is no need to place a foot on an operational pedal which is at its step-on releasing position. As a result, it is possible to avoid the inconvenience apt to be invited when a foot is placed on an operational pedal such as a brake pedal or a clutch pedal, i.e. transmission loss, unnecessary frictional wear of a friction disc of the clutch or brake caused by an accidental step-on operation on the operational pedal resulting from violent swaying of the vehicle body during traveling, can be avoided.

Further, as the possibility of accident touch on the operational pedal by the foot is lower than the case of placing the foot on the boarding step, the step-on switchover motion from the footrest member to the operational pedal as a preliminary motion for effecting a step-on operation on the operational pedal can be effected more easily. Consequently, the operability of the operational pedal can be improved.

As a further solution for accomplishing the second object more preferably:

the footrest member is disposed at right-left center of the lower cover.

With this solution, since the footrest member is disposed at the right-left center of the lower cover, it is possible to avoid the possibility of boarding or alighting action in a lateral direction relative to the vehicle body being interfered by the presence of the footrest member.

Therefore, good boarding/alighting performance can be secured in spite of the provision of the footrest member.

As a further solution for accomplishing the second object more preferably:

the footrest member includes an accommodating portion under a footrest face thereof.

With this solution, the space under the footrest member can be effectively utilized as an accommodating space, in which tools or the like can be accommodated.

As a further solution for accomplishing the second object more preferably:

the footrest member is configured such that a height position of its footrest face is higher than a height position of a step-on face of an operational pedal which is disposed laterally of the steering frame.

With this solution, it is possible to avoid the accidental contact between feet placed on the footrest members and the operational pedals more reliably. Further, since step-on switchover motion from the footrest member to an operational pedal as a preliminary motion for effecting a step-on operation on the operational pedal can be carried out in the form of a downward motion, this step-on switchover motion can be carried out even more easily.

As a further solution for accomplishing the second object more preferably:

the steering frame is disposed erect on the vehicle body frame via a vibration-isolating member.

With this solution, it becomes possible to cause vibration from the vehicle body side to be transmitted less likely to the foot placed on the footrest member.

DESCRIPTION OF THE PREFERRED EMBODIMENTS

Next, as an exemplary embodiment of the present invention, there will be described an embodiment applying the present invention to a tractor as an example of work vehicle, with reference to the accompanying drawings.

Figure 1:
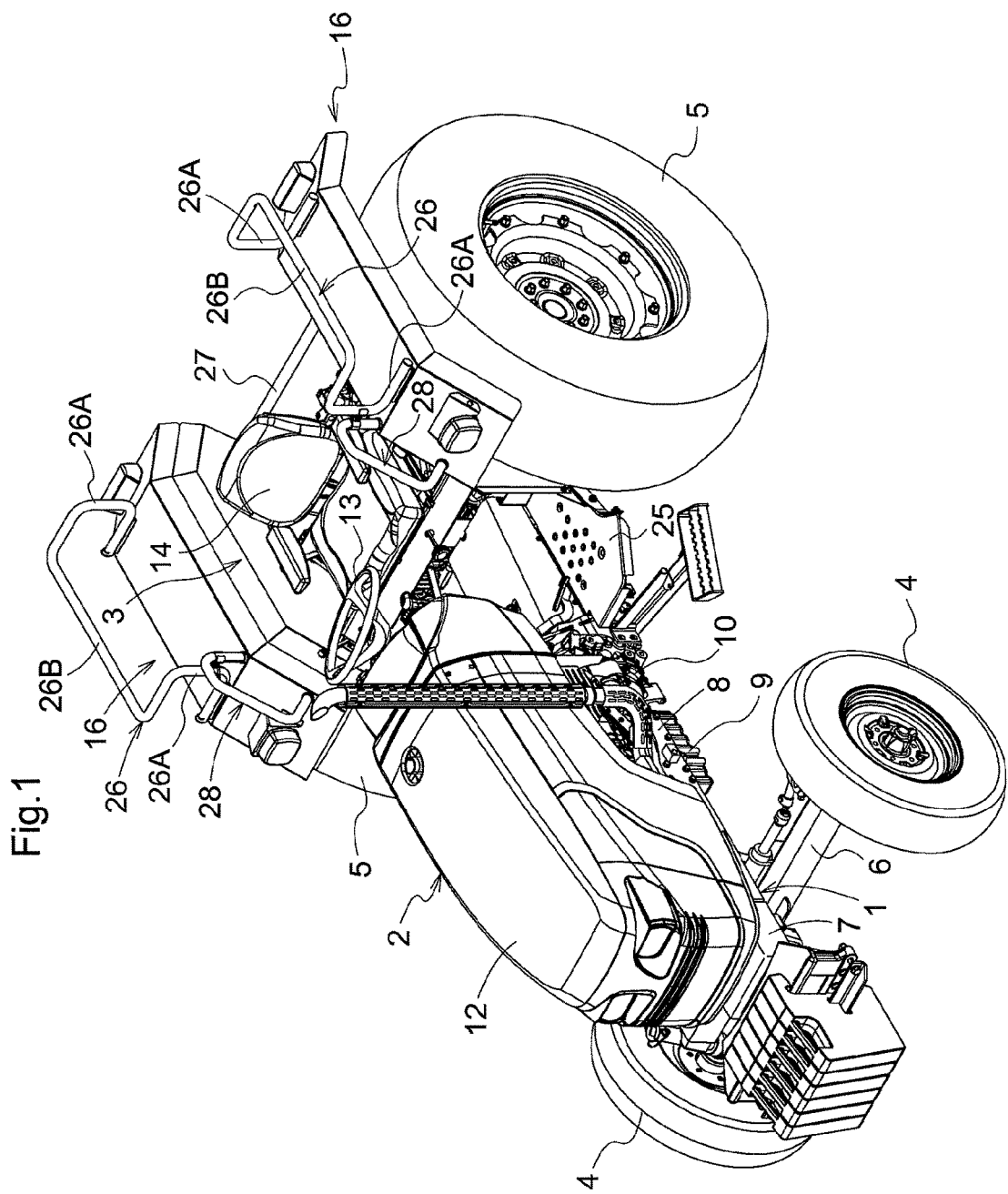
FIG. 1 is a perspective view of a tractor.
Figure 9:
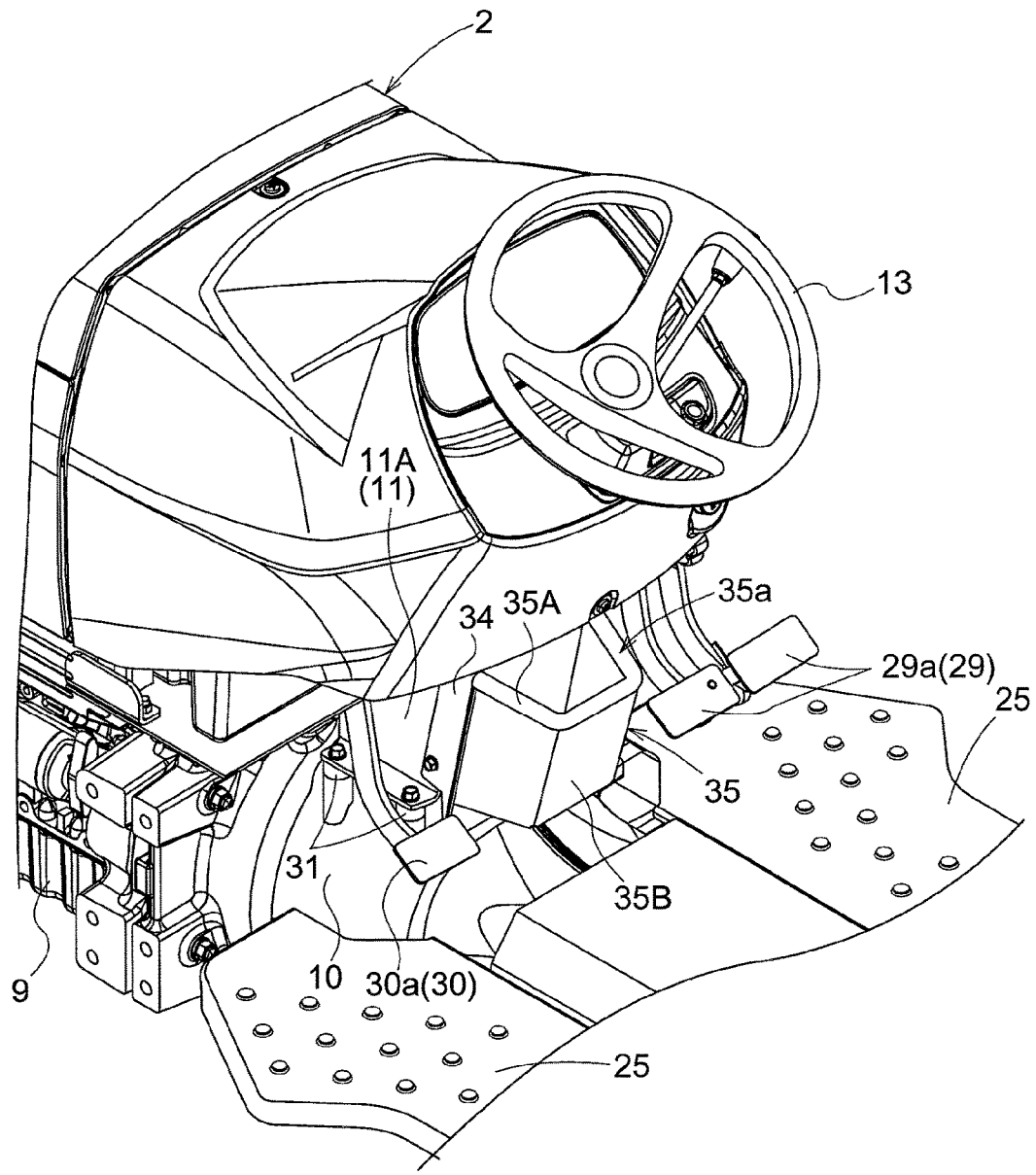
FIG. 9 is a perspective view of principal portions showing a configuration of a footrest member.
Figure 10:
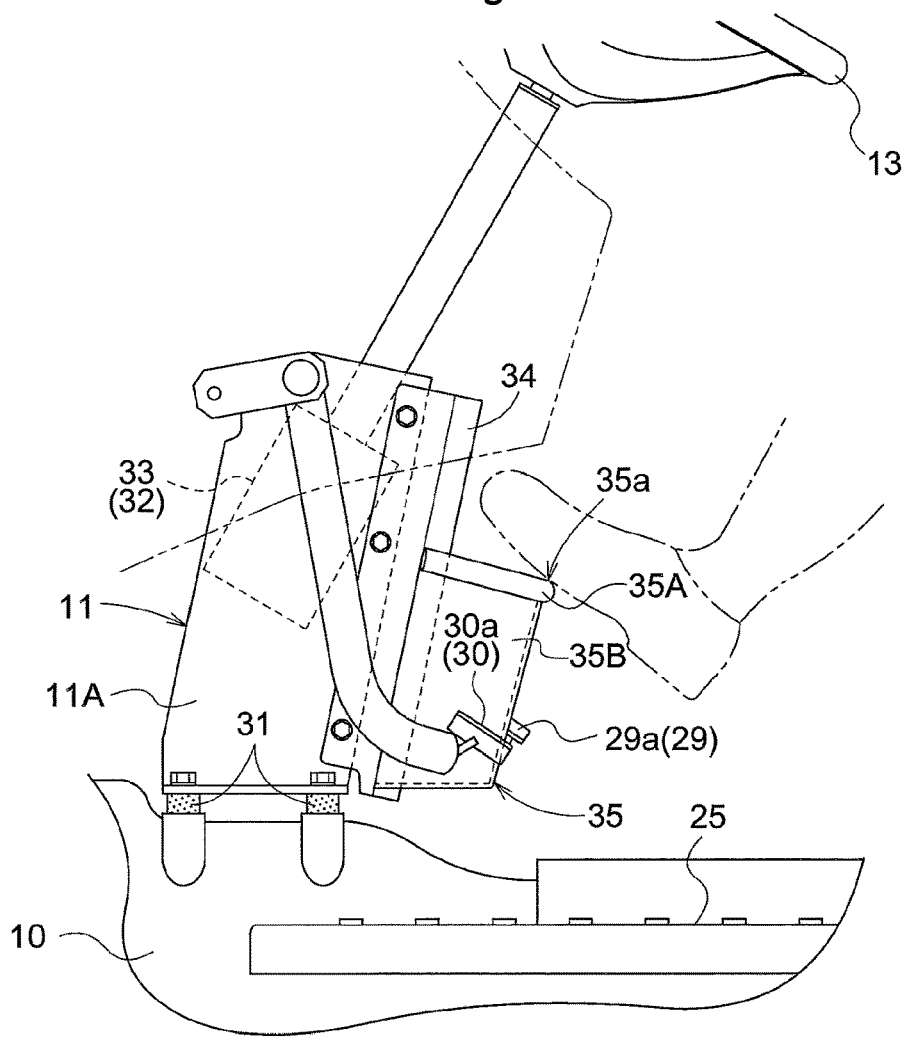
FIG. 10 is a left side view of principal portions showing a configuration of the footrest member.

As shown in FIG. 1, FIG. 9 and FIG. 10, a tractor illustrated in this embodiment includes an engine section 2 mounted at a front half portion of a vehicle body frame 1, and a riding driving section 3 mounted at a rear half portion of the vehicle body frame 1. The tractor 1 further includes, as a driving device, front wheels 4 configured to act as driving wheels which can be braked on the right and left sides of the engine section 2 and also includes, as a further driving device, rear wheels 5 configured to act as driving wheels which can be braked on the right and left sides of the riding driving section 3. Thus, this tractor 1 is configured to act as a four-wheel drive type.

Referring to the vehicle body frame 1, a water-cooled and vertical-mount type diesel engine (to be referred to as the "engine" hereinafter) 9 is connected to a rear portion of a front axle frame 7 supporting a front axle case 6 via right and left side members 8 comprised of band steel. Further, to a lower portion of this engine 9, there is connected a housing unit 10 forming the rear half portion of the vehicle body frame 1. And, at a front end of the housing unit 10, there is disposed erect a steering frame 11 having an approximately portal shape as seen in the front-rear direction.

As shown in FIG. 1, the engine section 2 comprises the engine 9 etc. disposed in an engine room formed by a hood 12, etc. The riding driving section 3 includes a steering wheel 13 for steering the front wheels, a driver's seat 14 adjustable in position in the front-rear direction, and so on.

As shown in FIGS. 1-4, the housing unit 10 includes rear axle cases 15 extending to the right and left from its rear portion. Each one of the right and left rear axle cases 15 includes a mounting portion 15A which mounts a support bracket 17 for supporting a rear wheel fender 16; and the support bracket 17 is detachably bolt-connected to this mounting portion 15A. Each mounting portion 15A is formed integrally with the rear axle case 15 associated therewith at a predetermined position of the rear axle case 15 such that a front-rear center of the bracket 17 bolt-connected to this mounting portion 15A is in agreement with the rotational center of the rear wheel 5 in the front-rear direction.

Figure 2:
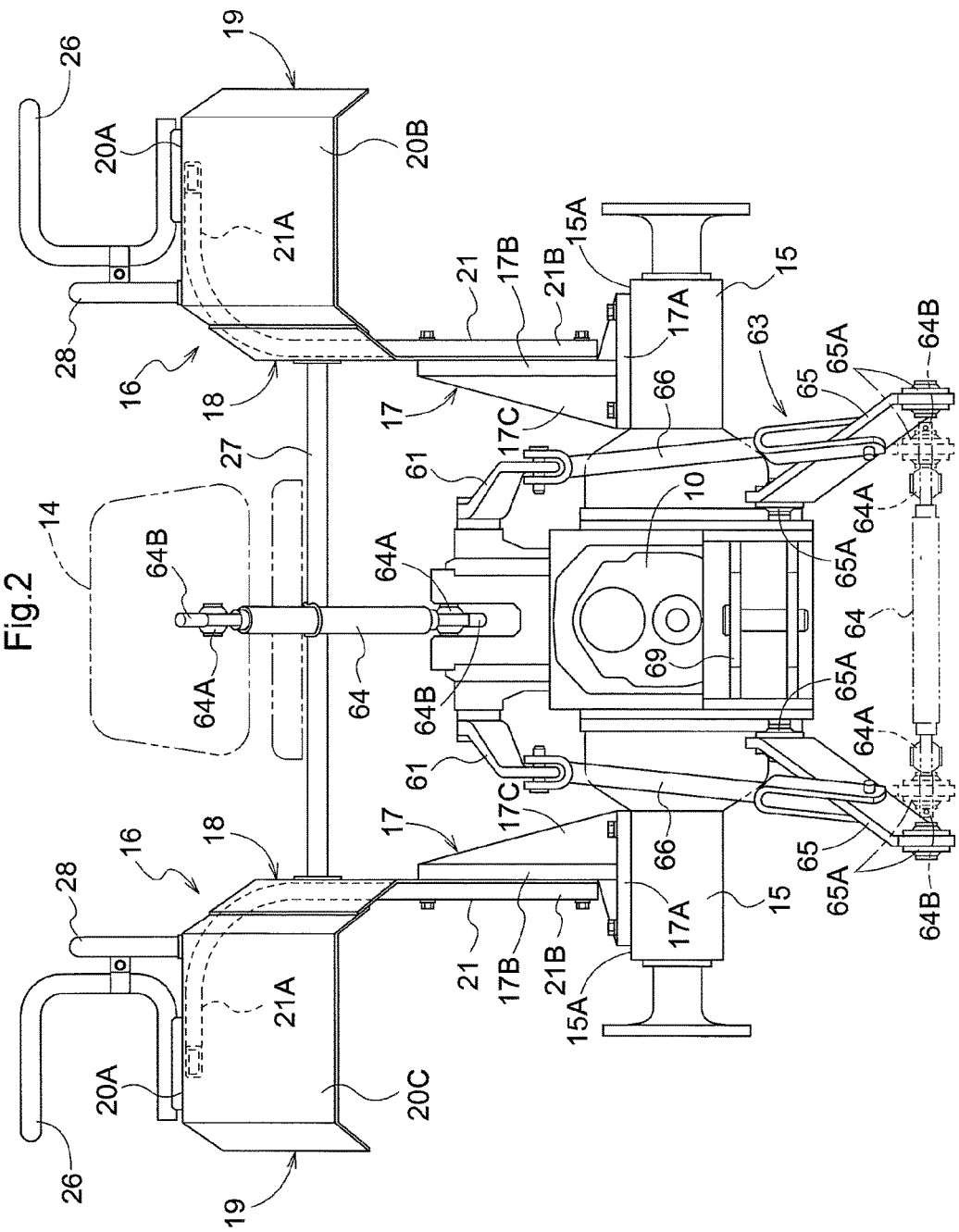
FIG. 2 is a rear view of principal portions showing a configuration of a fender and other components.
Figure 3:
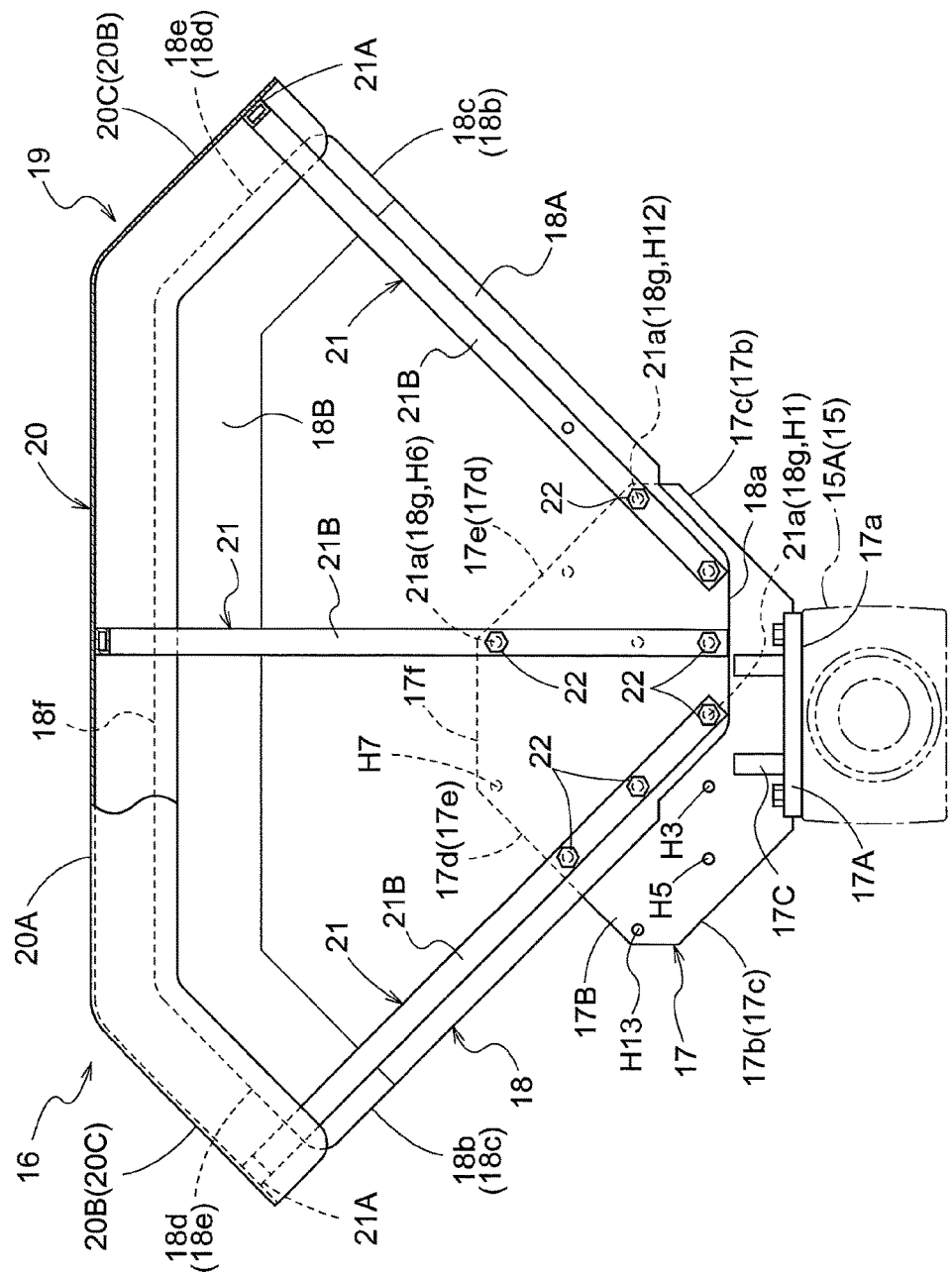
FIG. 3 is a left side view partially in vertical section of the fender.
Figure 4:
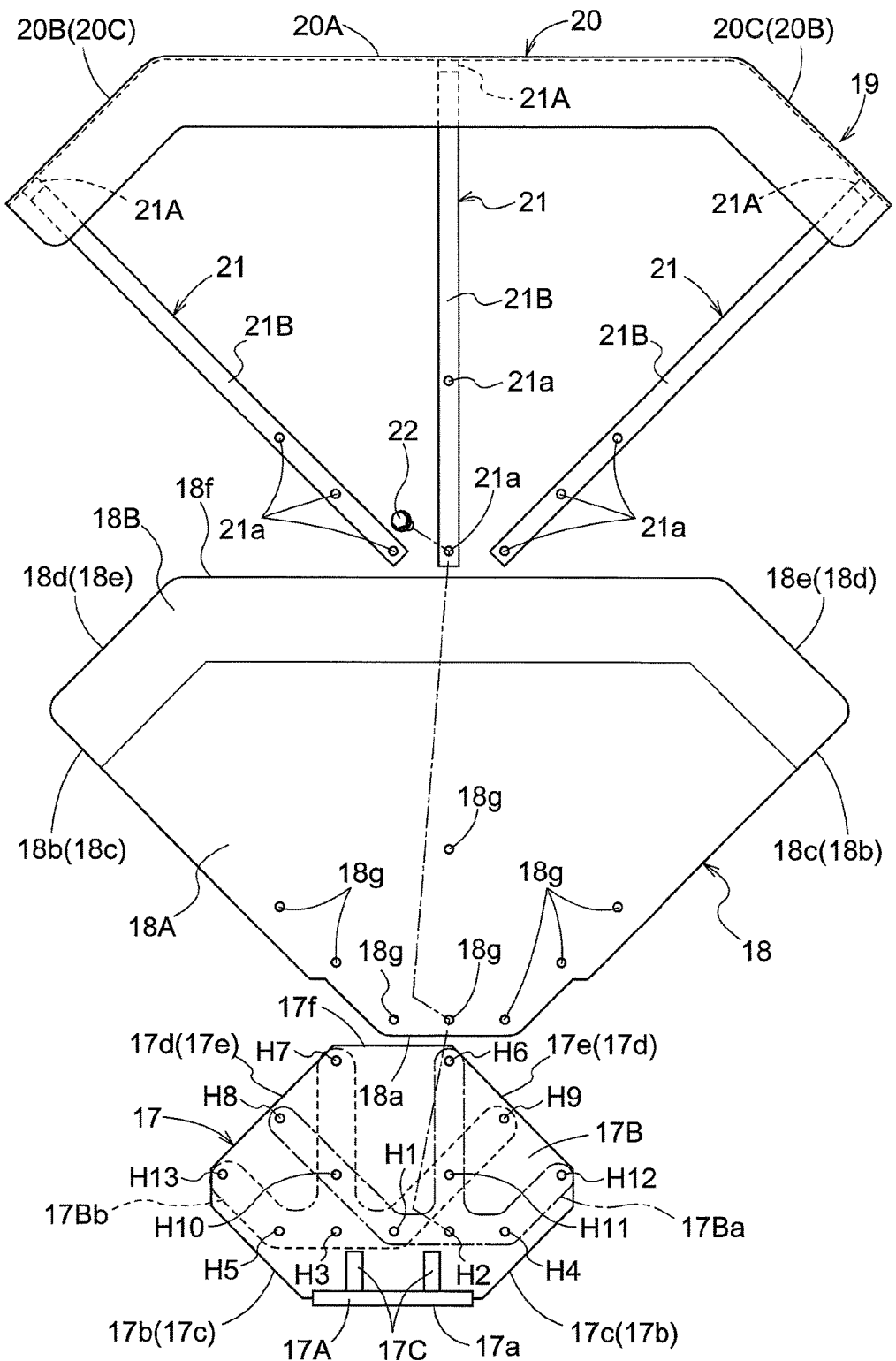
FIG. 4 is an exploded left side view of the fender.

As shown in FIGS. 2-4, each of the right and left fenders 16 comprises a two-piece structure including a vertical plate member 18 covering an inner face of an upper side of the corresponding rear wheel 5 from the inner side of the vehicle body, and a top plate member 19 covering the upper side of the corresponding rear wheel 5 from above.

Each right/left vertical plate member 18 has a front-rear symmetric approximately hexagonal and fan-like shape (sector shape) in side view, including: a horizontal and short lower edge 18a; long front-rear one side edge 18b and long front-rear other side edge 18c having a same length and extending from the opposed ends of this lower edge 18a at a same slope angle and upwards to the outer side; short front-rear one end upper end edge 18d and short front-rear other upper end edge 18e having a same length and extending from the upper end of the front-rear one side edge 18b or front-rear other side edge 18c at a same slope angle and upwards to the inner side; and a horizontal and long upper edge 18f extending between the upper end of the front-rear one end edge 18d and the upper end of the front-rear other end edge 18e. Further, in each right/left vertical plate member 18, its lower side forms a vertical plate portion 18A disposed erect along the rear wheel 5, and its upper edge portion forms a sloped portion 18B sloped laterally outwards. With these portions 18A, 18B, each right/left vertical plate member 18 is configured to act as a right-left interchangeable member which can be used in front-rear inversion.

Each right/left top plate member 19 includes a top plate 20 having a downwardly oriented U-shaped cross sectional shape as seen in the front-rear direction, and three connecting arms 21 extending from the top plate 20 along the outer side face of the vertical plate member 18 towards the support bracket 17. Each top plate 20 has a front-rear symmetric shape including: a horizontal portion 20A extending along the upper edge 18f of the vertical plate member 18; and one end side sloped portion 20B and the other end side sloped portion 20C extending along the front-rear one end side upper edge 20d or the front-rear other end side upper edge 18e of the vertical plate member 18. Each connecting arm 21 is bent into an approximately inverted L-shape including: a connecting portion 21A connected to the back face of the top plate 20; and an extending portion 20B extending along the outer side face of the vertical plate member 18. And, the connecting arm 21 on the one front/rear side end is welded to a front-rear one end of the top plate 20 under a sloped posture along the front-rear one end side edge 18b of the vertical plate member 18. Further, the connecting arm 21 on the other front/rear side end is welded to a front-rear other end of the top plate 20 under a sloped posture along the front-rear other end side edge 18c of the vertical plate member 18. Moreover, the connecting arm 21 disposed at the front-rear middle position is welded to a front-rear intermediate portion of the horizontal portion 20A under a suspended (vertical) posture. And, with these arrangements, each of the right and left top plate member 19 is provided with a front-rear symmetric shape, thus being configured to act as a right-left interchangeable member which can be used in front-rear inversion.

In each one of the right and left fenders 16, a right/left end side edge portion of the top plate 20 of the top plate member 19 is spot-welded to an upper edge portion of the vertical plate member 18, and the extending portion 21B of each connecting arm 21 is spot-welded to the outer side face of the vertical plate member 18, whereby the fender 16 is provided with a front-rear symmetric shape, so that this fender 16 is configured to act as a right-left interchangeable member that can be used in front-rear inversion. And, each connecting arm 21 is configured to function as a reinforcing rib for the vertical plate member 18 and the top plate 20.

Each one of the right and left support brackets 17 is comprised of a cast body integrally formed of a flange 17A allowing bolt-connection to the rear axle case 15, a vertical wall 17B allowing bolt-connection to a lower portion in the front-rear center region of the fender 16, a plurality of reinforcing ribs 17C, and so on. Further, each right/left support bracket 17 has a front-rear symmetric approximately hexagonal shape in side view, including: a horizontal lower edge 17a; a front-rear one end side upper edge 17b and a front-rear other end side edge 17c having a same length and extending form the opposed ends of the lower edge 17a at a same slope angle and upwards to the outer side; a front-rear one end side upper edge 17d and a front-rear other end side upper edge 17e having a same length and extending from the upper end of the front-rear end side edge 17b or front-rear other end side edge 17c at a same slope angle and upwards to the inner side; a horizontal and long upper edge 17f extending between the upper end of the front-rear one end side edge 17d and the upper end of the front-rear other end side edge 17e, and so on. Each flange 17A has a vertically rectangular shape. Each reinforcing rib 17C is disposed in front-rear symmetry. And, with the above arrangements altogether, each one of the right and left support brackets 17 is provided with a front-rear symmetric shape, so it is configured to act as a right-left interchangeable member that can be used in front-rear inversion.

In each right/left support bracket 17, the slope angle of each of the front-rear one side edge 17b and front-rear other side edge 17c is set to the same angle as the slope angle of each of the front-rear one side edge 18b and front-rear other side edge 18c of the vertical plate member 18. Further, in each right/left support bracket 17, the slope angle of each of the front-rear one end side upper edge 17d and front-rear other end side edge 17e is set to the same angle as the slope angle of each of the front-rear one side upper edge 18d and front-rear other upper side edge 18e of the vertical plate member 18.

Each one of the right and left vertical walls 17B includes: a first threaded hole H1 formed downwardly of the front-rear center thereof; a second threaded hole H2, a third threaded hole H3, a fourth threaded hole H4 and a fifth threaded hole H5 which are formed in alignment with a predetermined spacing from one another in the front-rear direction; a sixth threaded hole H6 and a seventh threaded hole H7 which are formed at an upper end portion with a predetermined spacing from one another immediately upwardly of the second threaded hole H2 or the third threaded hole H3 adjacent the first threaded hole H1; an eighth threaded hole H8 formed at an upper end portion with a predetermined spacing from the first threaded hole H1 in the direction along the front-rear one side edge 17b; a ninth threaded hole H9 formed at an upper end portion with a predetermined spacing from the first threaded hole H1 in the direction along the front-rear other side edge 17c; a tenth threaded hole H10 formed at the crossing point between a connecting line which connects the center of the first threaded hole H1 with the center of the eighth threaded hole H8, and a connecting line which connects the center of the third threaded hole H3 with the center of the seventh threaded hole H7; an eleventh threaded hole H11 formed at the crossing point between a connecting line which connects the center of the first threaded hole H1 with the center of the ninth threaded hole H9, and a connecting line which connects the center of the second threaded hole H2 with the center of the sixth threaded hole H6; a twelfth threaded hole H12 formed at an upper end portion with a predetermined spacing from the fourth threaded hole H4 in the direction along the front-rear other side edge 17c; and a thirteenth threaded hole H13 formed at an upper end portion with a predetermined spacing from the fifth threaded hole H5 in the direction along the front-rear one side edge 17b.

And, of the respective threaded holes H1-H13, the first threaded hole H1, the second threaded hole H2, the fourth threaded hole H4, the sixth threaded hole H6, the eighth threaded hole H8, the tenth threaded hole H10 and the twelfth threaded hole H12 constitute a left connecting portion 17Ba for mounting the fender 16 with a front/rear one side offset relative to the front-rear center of the vertical wall 17B. On the other hand, the first threaded hole H1, the third threaded hole H3, the fifth threaded hole H5, the seventh threaded hole H7, the ninth threaded hole H9, the eleventh threaded hole H11 and the thirteenth threaded hole H13 constitute a right connecting portion 17Bb for mounting the fender 16 with a front/rear other side offset relative to the front-rear center of the vertical wall 17B. Whereby, each of the right and left vertical walls 17B is arranged in front-rear symmetry, with the first threaded hole H1 shared by the left connecting portion 17Ba and the right connecting portion 17Bb.

In each of the right and left fenders 16, the vertical plate member 18 defines eight through holes 18g for allowing bolt-connection to the left connecting portion 17Ba or the right connecting portion 17Bb of the support bracket 17. In the top plate member 19, each of the connecting arms 21 on the front-rear end sides defines three through holes 21a for allowing bolt-connection to the left connecting portion 17Ba or the right connecting portion 17Bb of the support bracket 17. Further, in the top plate member 19, the front-rear intermediate connecting arm 21 defines two through holes 21a for allowing bolt-connection to the left connecting portion 17Ba or the right connecting portion 17Bb of the support bracket 17. The above-described arrangements enable fastening of the vertical plate member 18 and the top plate member 19 together with the left connecting portion 17Ba or the right connecting portion 17Bb, using the respective through holes 18g, 21a corresponding to the left connecting portion 17Ba or the right connecting portion 17Bb.

With the above-described arrangements, the right and left fenders 16 and the right and left support brackets 17 can respectively be provided with the front-rear symmetric shape, thus being configured to act as a right-left interchangeable member that can be used in front-rear inversion. With this, compared with a case of configuring each one of the right and left fenders 16 and the right and left support brackets 17 as a right-left non-interchangeable member, cost reduction through right-left interchangeability of each mold and simplification of parts management are made possible.

Further, in each of the right and left fenders 16, the left fender 16 is connected to the left connecting portion 17Ba of the left support bracket 17 with using seven bolts 22, and the right fender 16 is connected to the right connecting portion 17Bb of the right support bracket 17 with using seven bolts 22. Whereby, the right/left fender 16 can be disposed at a rearwardly offset position from the right-left center of the right/left support bracket 17, with the right-left center of the fender 16 being spaced by a predetermined distance rearward from the right-left center of the support bracket 17 associated therewith. Namely, the right and left respective fenders 16 can be disposed at a rearwardly offset position relative to the right and left rear wheels 5, with the right-left center of each fender 16 being spaced rearward by a predetermined distance from the rotational center of each rear wheel 5. Whereby, each of the right and left fenders 16 is provided with the front-rear symmetric shape, thus configured to act as the right-left interchangeable member that can be used in front-rear inversion, and at the same time, the rearward extending length of the top plate 20 of each fender 16 relative to the rear wheel 5 can be increased without extending the front-rear length of each fender 16 more than necessity. As a result, the top plate 20 of each fender 16 can receive and block mud or the like, which is splashed up by each rear wheel 5 at the time of forward (and sometimes high-speed) traveling, in a more reliable manner to thereby effectively preventing rearward scattering of the mud or the like splashed up by each rear wheel 5.

Figure 5:
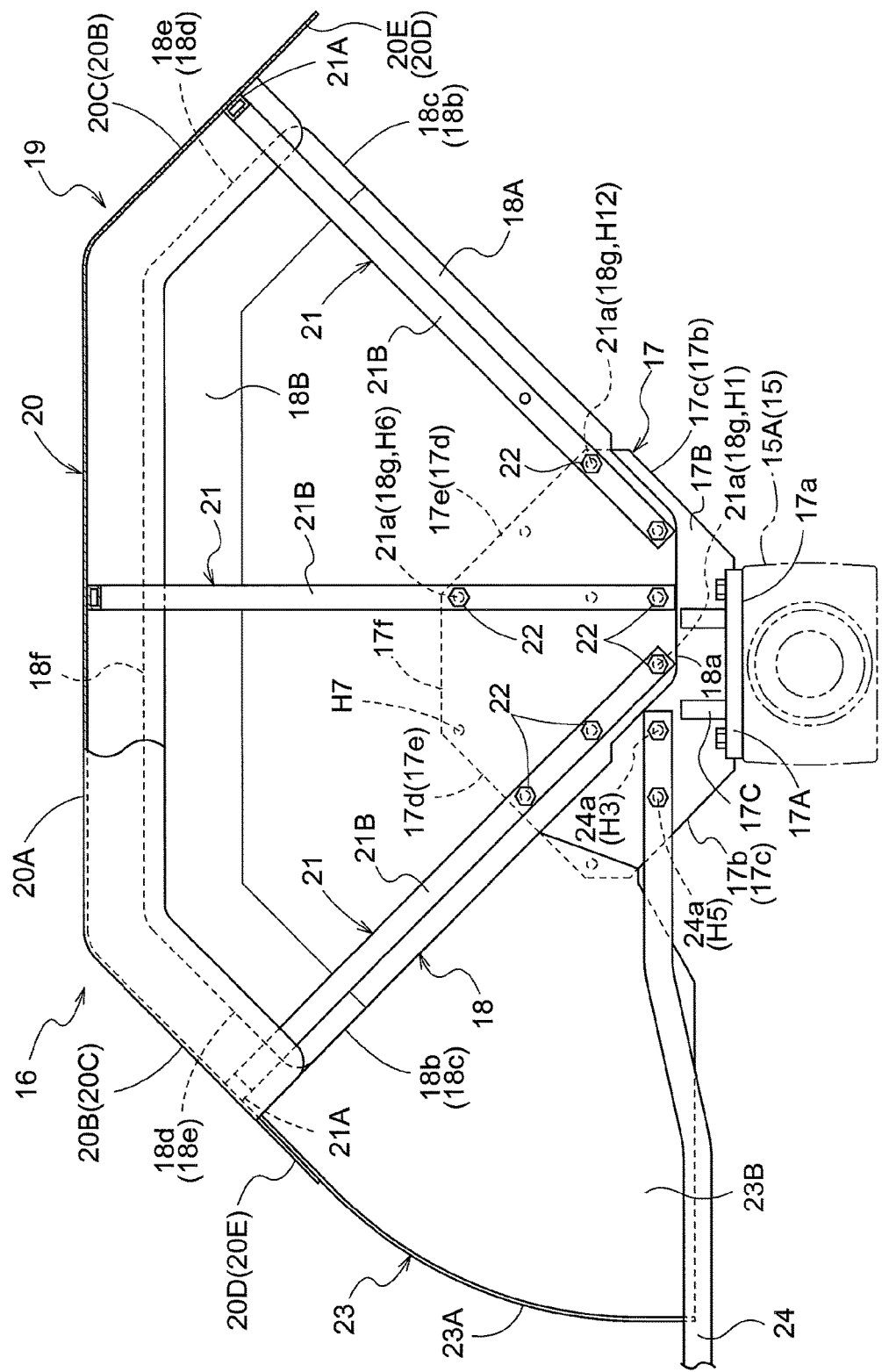
FIG. 5 is a left side view partially in vertical section showing a configuration of a fender in a further embodiment provided with a front side cover member.

As shown in FIG. 5, the right/left fender 16 can also be a three-piece structure including a right or left non-interchangeable (dedicated) front side cover member 23 for covering the front side of the rear wheel 5 associated therewith, in addition to the vertical plate member 18 and the top plate member 20 as described above.

In the right/left fender 16 having the above structure, each front side cover member 23 includes: a vertical plate portion 23A covering the inner side face of the front side of the corresponding rear wheel 5 from the inner side of the vehicle body; and a front plate portion 23B covering the upper side of the front portion of the corresponding rear wheel 5 from the front side.

In each top plate member 19, the one end side sloped portion 20B and the other end side sloped portion 20C include extending portions 20D, 20E, respectively, extending from its end portion with a same length in the extending direction of the one end side sloped portion 20B or the other end side sloped portion 20C. Each of the extending portions 20D, 20E is configured to be usable as a support portion for supporting the front plate portion 23B of the corresponding right/left front side cover member 23.

Further, each front side cover member 23 includes, at the lower end thereof, a front-rear oriented connecting arm 24. The left connecting arm 24 defines, at is rear portion, two through holes 24a allowing bolt-connection to the left support bracket 17 with using the un-used third threaded hole H3 and fifth threaded hole H5 of the left support bracket 17. The right connecting arm 24 defines, at is rear portion, two through holes 24a allowing bolt-connection to the right support bracket 17 with using the un-used second threaded hole H2 and fourth threaded hole H4 of the right support bracket 17. With these arrangements, the right and left front side cover members 23 respectively can be connected to the corresponding support bracket 17 with using two bolts 22.

The front side of each connecting arm 24 is connected to a boarding step 25 (see FIG. 1) included in the riding driving section 3 by being spot-welded to the corresponding right/left outer edge portion of the boarding step 25.

When the right/left fender 16 having the above-described three-piece structure is connected to the left connecting portion 17Ba or the right connecting portion 17Bb of the corresponding support bracket 17, each fender 16 can be disposed with a rearward offset relative to the right-left center of each support bracket 17. Whereby, the rearward extending length of the top plate 20 of each fender 16 relative to the rear wheel 5 can be increased and at the same time, the front plate portion 23B of the front side cover member 23 of each fender 16 can be disposed near the front end of the rear wheel 5. So that, the boarding/alighting space between the front side cover member 23 and the hood 12 can be increased. As a result, scattering to the front/rear side of mud or the like splashed up by each rear wheel 5 can be effectively restricted by each fender 16 and at the same time, a boarding/alighting operation from the boarding/alighting space can be carried out smoothly.

Figure 6:
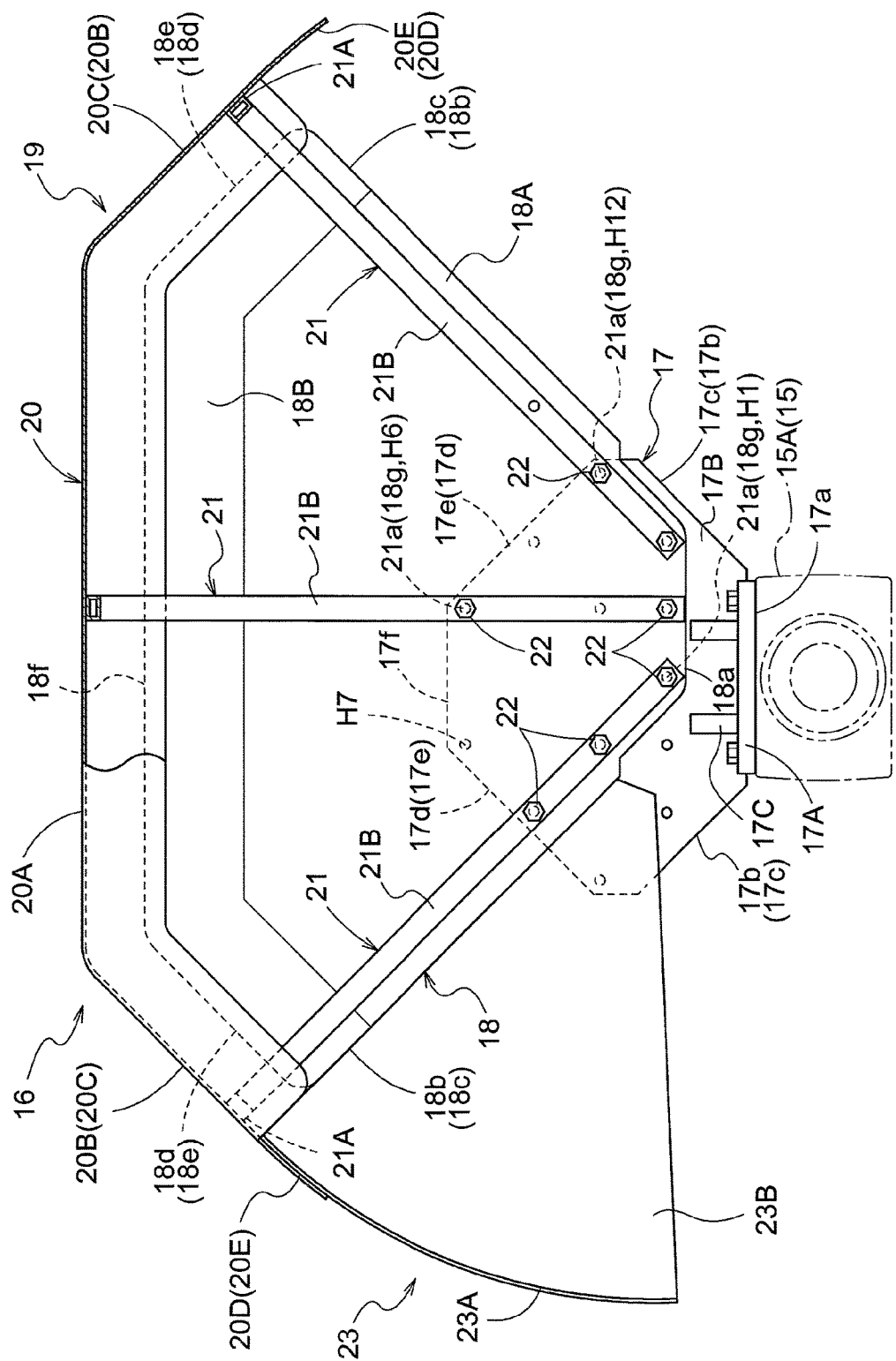
FIG. 6 is a left side view partially in vertical section showing a configuration of a fender in a further embodiment provided with a front side cover member having a vertically symmetric shape.

As shown in FIG. 6, in the case of the right/left fender 16 having the three-piece structure including the front side cover member 23, by providing each front side cover member 23 with a vertically symmetric shape, the fender 16 can be configured to act as a right-left interchangeable member that can be used in vertical inversion.

Figure 7:
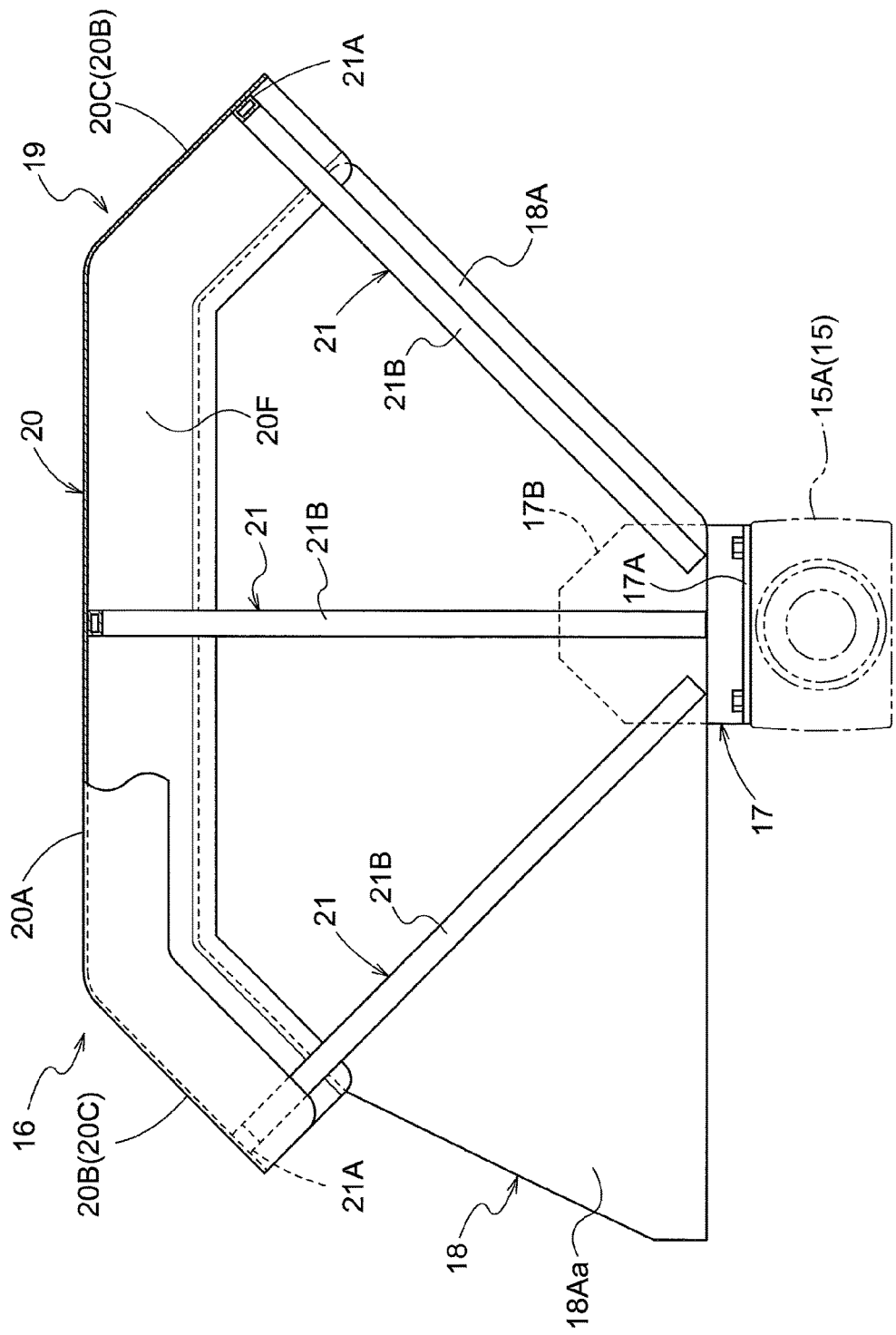
FIG. 7 is a left side view partially in vertical section showing a configuration of a fender in a still further embodiment provided with a front-side vertical plate portion.

As shown in FIG. 7, in the case of the right/left fender 16 having the two-piece structure, each vertical plate member 18 can omit the sloped portion 18B as described above. Instead, the vertical plate member 18A thereof can be provided with a front side vertical wall portion 18Aa corresponding to the vertical plate portion 23A of the front side cover member 23 as described above, so that the fender 16 is configured to act as a right-left interchangeable member having a front-rear asymmetric and right-left symmetric shape.

Further, each top plate member 19 can be configured to act as a right-left interchangeable member having a front-rear symmetric and right-left asymmetric shape by providing the top plate 20 thereof with a sloped portion 20F corresponding to the sloped portion 18B of the vertical plate member 18 as described above.

And, a right-left non-interchangeable fender 16 can be configured by connecting a right-left interchangeable vertical plate member 18 that can be used on the right or left side under a predetermined front-rear posture and a right-left interchangeable top plate member 19 that can be used on the right or left side in front-rear inversion.

Though not shown, in each top plate member 19, the number and the shape of the connecting arms 21 to be provided therein can vary in many ways, as long as the top plate member 19 can be configured to act as a right-left interchangeable member. For instance, each top plate member 19 can be provided with four or five connecting arms 21 or can be provided without any connecting arms 21.

As shown in FIG. 7, the right/left support bracket 17 can be comprised of a steel plate bent into an approximate L-shape including a flange 17A allowing bolt-connection to the rear axle case 75, and a vertical wall 17B allowing bolt-connection to the lower portion of the fender 16.

Though not shown, the right and left support brackets 17 can be configured with right-left interchangeable connecting portions provided in their lateral walls 17B.

Though not shown, the right and left fenders 16 and the right and left support brackets 17 can be configured for use with the front wheels. Further, these can also be configured for use with crawlers in the case of a tractor configured to act as the semi-crawler type or full-crawler type, provided with crawlers as traveling devices.

Figure 8:
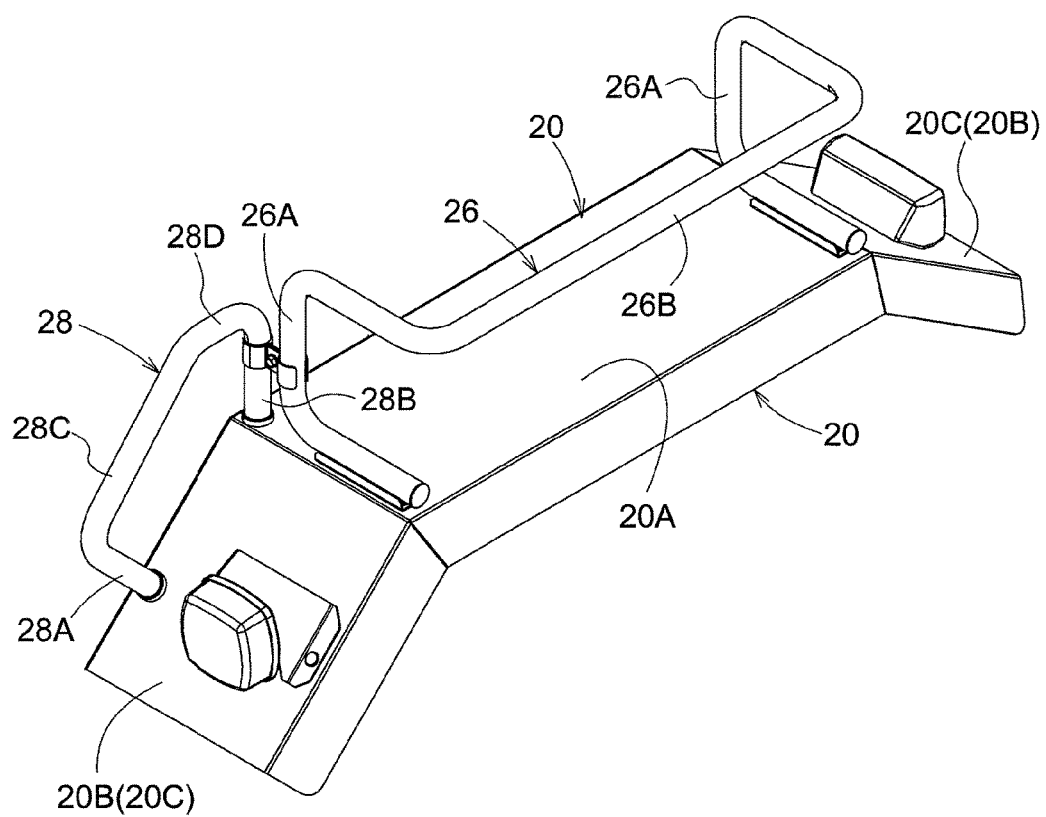
FIG. 8 is a perspective view of principal portions showing shapes of a guard member and a handrail included in the fender.

As shown in FIG. 1, FIG. 2 and FIG. 8, the right and left fenders 16 include the horizontal portions 20A to allow their top plates 20 to be usable as a loading platform. And, each horizontal portion 20A includes a guard member 26 for preventing dropping of a load mounted thereon to the outside of the vehicle.

Each guard member 26 is formed by bending a round steel bar into a front-rear symmetric shape having front and rear leg portions 26A each having an L-shape in its front/rear view, and a guard portion 26B extending therebetween and having a U-shape in its plan view, so that the guard member 26 is configured to act as a right-left interchangeable member having a front-rear symmetric shape that can be used in front-rear inversion.

With the above, through the right-left interchangeability of the guard members 26, working cost reduction and readiness of parts management are realized and at the same time, dropping of a load placed on the respective horizontal portions 20A of the fenders 16 to the outside of the vehicle body can be prevented.

As shown in FIG. 1 and FIG. 3, the right and left fenders 16 are provided with enhanced shape retaining strength by joining the rear upper portions of their vertical plate members 18 via a right-left oriented connecting member 27 extending between these right and left vertical plate members 18. With this, high shape-retaining strength, allowing the horizontal portion 20A of each fender 16 to be used as a loading platform, can be secured in a more reliable manner.

As shown in FIG. 1, FIG. 2 and FIG. 8, each right/left fender 16 includes, at the front end portion of the top plate 20 thereof, a handrail 28 that can be used at the time of boarding/alighting operations. Each handrail 28 is formed by bending a round steel bar into a front-rear asymmetric and right-left symmetric shape having front and rear leg portions 28A, 28B to be connected to the top plate 20 of the corresponding fender 16, a rearward rising sloped portion 28C extending rearwards from the front side leg portion 28A, and a horizontal portion 28D extending from the rearward rising sloped portion 28C to the rear side leg portion 28B, whereby the handrail 28 is configured to act as a right-left interchangeable member that can be used on both right and left sides under a predetermined front-rear oriented posture. And, in order to allow the horizontal portion 28D thereof to be used as e.g. an armrest at the time of driving, each handrail 28 is disposed at a position on the driver's seat side in each fender 16.

With the above, it is possible to facilitate boarding/alighting operations and also to make the riding posture comfortable at the time of driving or the like, together with realization of working cost reduction and readiness of parts management through the right-left interchangeability of the handrails 28.

Though not shown, the riding driving section 3 is provided with a hand accelerator lever of a position retaining type that allows a constant-speed traveling at a desired traveling speed.

As shown in FIG. 9 and FIG. 10, the riding driving section 3 includes, at a position on the right side of the steering frame 11, right and left parking brake pedals 29 to act as operational pedals. The riding driving section 3 further includes a clutch pedal 30 to act as another operational pedal at a position on the left side of the steering frame 11.

The steering frame 11 is mounted erect via a rubber vibration-isolating member 31 at a position forwardly of the driver's seat 14 in the vehicle body frame 1. Further, the steering frame 11 mounts, between its right and left side plates 11A, a control unit 33 of a power steering mechanism 32 configured to act as a full-hydraulic type mechanism. And, the steering frame 11 includes a lower cover 34 to be attached to the right and left side plates 11A in such a manner as to cover this steering frame 11 together with the control unit 33. This lower cover 34 includes a footrest member 35 to be used by a diver seated at the driver's seat 14.

The footrest member 35 includes a footrest portion 35A formed of a round metal bar bent into U-shape in its plan view and a bottomed accommodating portion 35B formed of a metal plate bent to form an accommodating space in cooperation with the lower cover 34. And, the footrest member 35 is configured such that the accommodating portion 35B is formed continuously with the lower side of the footrest portion 35A to make a space, which is defined between the lower cover 34 and the footrest portion 35A, act as an opening. The footrest portion 35A is disposed on the upper side of right-left center portion of the lower cover 34 such that a height position of a footrest face 35a formed by its upper edge may come higher than both a height position of a step-on face 29a of the parking brake pedal 29, and a height position of a step-on face 30a of the clutch pedal 30.

With the above, at the time of a constant-speed traveling when any step-on operations on the right and left parking pedals 29 or the clutch pedal 30 are not required, both feet can be placed not on the boarding steps where accidental contact tends to occur between the feet and the right and left parking brake pedals 29 or the clutch pedal 30, but can be placed in a stable manner on the footrest member 35 that is disposed upwardly of the boarding steps 25, thus being capable of reducing such accidental contact between the feet and the right and left parking brake pedals 29 or the clutch pedal 30.

As a result, the risk of inadvertent brake or clutch operation due to such contact between the feet and the right and left parking brake pedals 29 or the clutch pedal 30, e.g. when the vehicle body is violently swayed during traveling, can be avoided in a more reliable manner.

Further, as the footrest member 35 is located at the right-left center portion of the riding driving section 3, it is possible to prevent the footrest member 35 from becoming an interference with the boarding or alighting operation to/from the above-described boarding/alighting space.

Moreover, since the height position of the footrest face 35a of the footrest member 35 is set higher than the respective height positions of the step-on faces 29a, 30a of the pedals 29, 30, the risk of accidental contact between the feet placed on the footrest member 35 and the right and left parking brake pedals 29 or the clutch pedal 30 can be avoided even more reliably. Further, the step-on switchover motion from the footrest member 35 to the right/left parking pedal 29 or the clutch pedal 30, which motion is effected before the right/left parking brake pedal 29 or the clutch pedal 30 is to be stepped on, can be carried out smoothly.

And, as the footrest member 35 is included in the steering frame 11 which is mounted erect on the vehicle body frame 1 in the vibration-isolated manner, it is possible to check transmission of vibration from the vehicle frame side to the feet placed on the footrest member 35.

Furthermore, the space under the footrest member 35 can be efficiently utilized as an accommodating space in which a maintenance tool and/or a working tool can be accommodated.

In addition, when a maintenance operation on e.g. the control unit 33, which is disposed between the right and left side plates of the steering frame 11, is to be carried out, the footrest member 35 together with the lower cover 34 can be detached from the steering frame 11. With this, in case e.g. the footrest member 35 is provided in the boarding step 25, it is possible to avoid such inconvenience as one occurring when maintenance operation on the control unit 33 or the like is made difficult because the footrest member 35 will remain on the boarding step, even after removal of the lower cover 34 from the steering frame 11.

Figure 11:
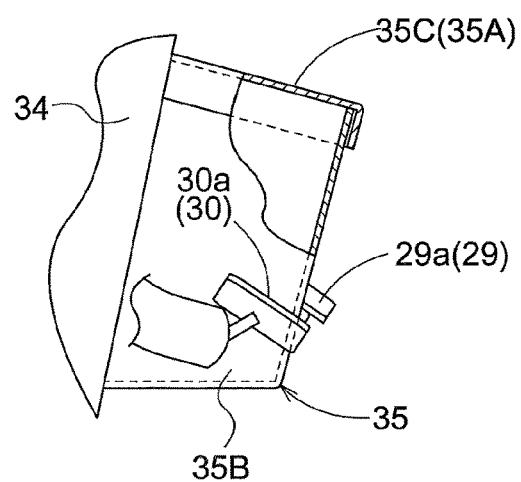
FIG. 11 is a left side view partially in vertical section of principal portions showing a configuration of a footrest member in a further embodiment.

As shown in FIG. 11, the footrest member 35 can be alternatively configured such that, instead of the footrest portion 35A formed of a round steel bar, a lid member 35C formed of metal plate, which openably closes an opening formed by the upper edge of the above-described accommodating portion 35B relative to the lower cover 34, may be used as the footrest portion 35A.

Though not shown, the footrest member 35 can be comprised of only the footrest portion 35A formed of a round or angular steel bar or pipe. Further, the footrest member 35 can be mounted in the lower cover 34 such that the height position of its footrest face 35a is located same as or lower than the respective height positions of the step-on faces 29a of the parking pedals 29 and the step-on face 30a of the clutch pedal 30.

Figure 12:
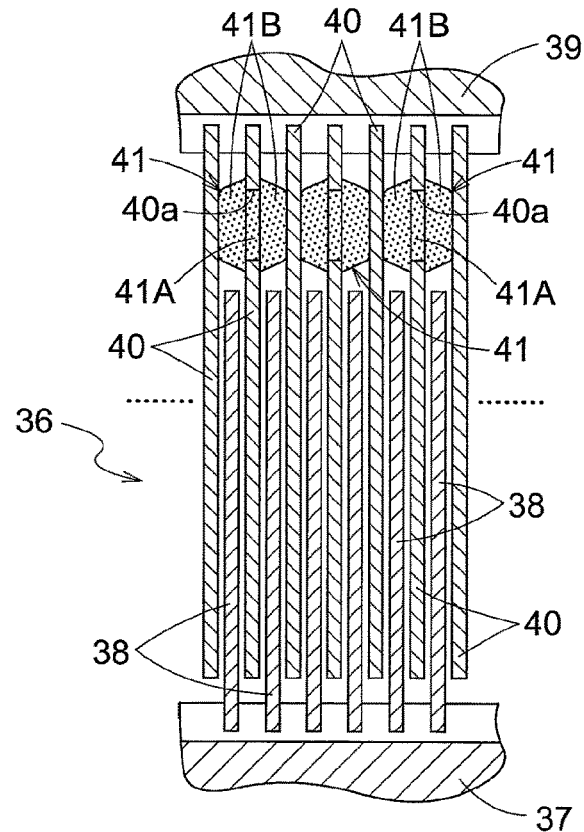
FIG. 12 is a side view in vertical section of principal portions showing a brake releasing configuration of a brake.
Figure 13:
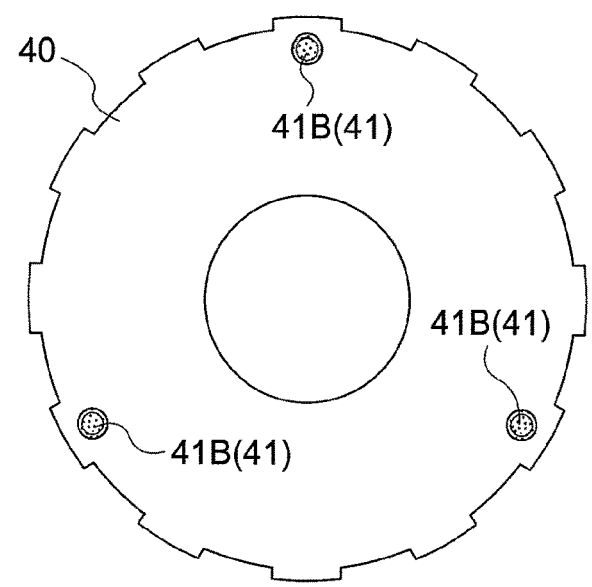
FIG. 13 is a front view of a separator plate showing the brake releasing configuration of the brake.

As shown in FIG. 12 and FIG. 13, each of right and left parking brakes 36, operably coupled with the right and left parking brake pedals 29, respectively, is configured to act as a multiple disc type brake including, in alternation, a plurality of brake discs 38 mounted on a brake shaft 37 to be rotatable together and slidable relative to each other, and a plurality of separator plates 40 mounted within a brake case 39 to be slidable relative to each other, but non-rotatable relative to each other. And, a plurality (three in FIG. 13) of elastic members 41 are mounted on predetermined, every other separate plate 40 among the plurality of separator plates 40 to act on the separator plates 40 adjacent thereto, with the elastic members 41 being aligned with one another at a predetermined pitch (120 degrees pitch in FIG. 13) in the circumferential direction, such that the elastic members 41 will be located in a circumferential region of the predetermined separator plate 40 on the more outer side than the outer circumference of the brake disc 38.

Each elastic member 41 is formed of an elastically deformable resin material such as rubber. And, each elastic member 41 is formed to be provided with a cylindrically shaped inner fitting portion 41A to be fitted within one of a plurality of through holes 40a formed in a predetermined separator plate 40 for allowing mounting of the elastic member 41, and a pair of acting portions 41B for acting on the respective adjacent separator plates 40. Each acting portion 41B has a frustoconical shape including a small diameter portion having a smaller diameter than the through hole 40a for facilitating fitting into the through hole 40a, and a large diameter portion having a larger diameter than the through hole 40a for preventing inadvertent detachment from the through hole 40a. Further, each acting portion 41B is formed such that its extending length from the inner fitting portion 41A is greater than the plate thickness of the brake disc 38. In operation of each acting portion 41B, when the brake disc 38 and the separator plate 40 are pressed against each other in response to a step-on operation on the parking brake pedal 29 corresponding thereto, the acting portion 41B will be elastically deformed so as to allow the pressed contact therebetween; and the acting portion 41B will be elastically returned to release the pressed contact therebetween in response to release of the step-on operation on the parking brake pedal 29 corresponding thereto and will return to its original shape in association with returning of the corresponding parking pedal 29 to the step-on releasing position.

With the above-described configuration, under the braking released state, the spacing between adjacent separator plates 40 can be larger than the plate thickness of the brake disc 38, so that the brake disc 38 and the separator 40 adjacent each other can be spaced apart in a more reliable manner. As a result, it is possible to avoid e.g. occurrence of power transmission loss in each parking brake 36, fall/drop in fuel consumption, or unnecessary frictional wear of the brake disc 38 and the separator plate 40, resulting from inadvertent sliding contact between the brake disc 38 and the separator plate 40 adjacent each other due to insufficient spacing therebetween under the braking released state.

Though not shown hereinafter, in each parking brake 36, the providing number and disposing spacing of the elastic members 41 to be provided in the predetermined separator plate 40 can vary in many ways. Specifically, four elastic members 41 can be arranged in alignment at a 90-degree pitch, or five elastic members 41 can be arranged in alignment at a 72-degree pitch.

Also, in each parking brake 36, a plurality of elastic members 41 can be mounted on predetermined, every other brake disc 38 among the plurality of brake discs 38 to act on adjacent brake discs 38, such that the elastic members 41 are aligned with one another at a predetermined pitch in the circumferential direction, in an inner region of the predetermined brake disc 38 located on more inner side than the inner circumference of the separator plate 40.

Further, in each parking brake 36, a plurality of elastic members 41 can be mounted on the predetermined separator plate 40 in alignment with one another at a predetermined pitch in the circumferential direction, in an outer region of the predetermined separator plate 40 located on more outer side than the outer circumference of the brake disc 38; and also a further plurality of elastic members 41 can be mounted on the predetermined brake disc 38 in alignment with one another at a predetermined pitch in the circumferential direction, in an inner region of the predetermined brake disc 38 located on more inner side than the inner circumference of the separator plate 40.

Moreover, a large diameter ring-shaped elastic member 41 can be mounted between the two adjacent separator plates 40 in an outer circumferential region on the more outer side than the outer circumference of the brake disc 38. Or, a small diameter elastic member 41 can be mounted between the two adjacent brake discs 38 in an inner circumferential region on the more inner side than the inner circumference of the adjacent separator plates 40.

Figure 14:
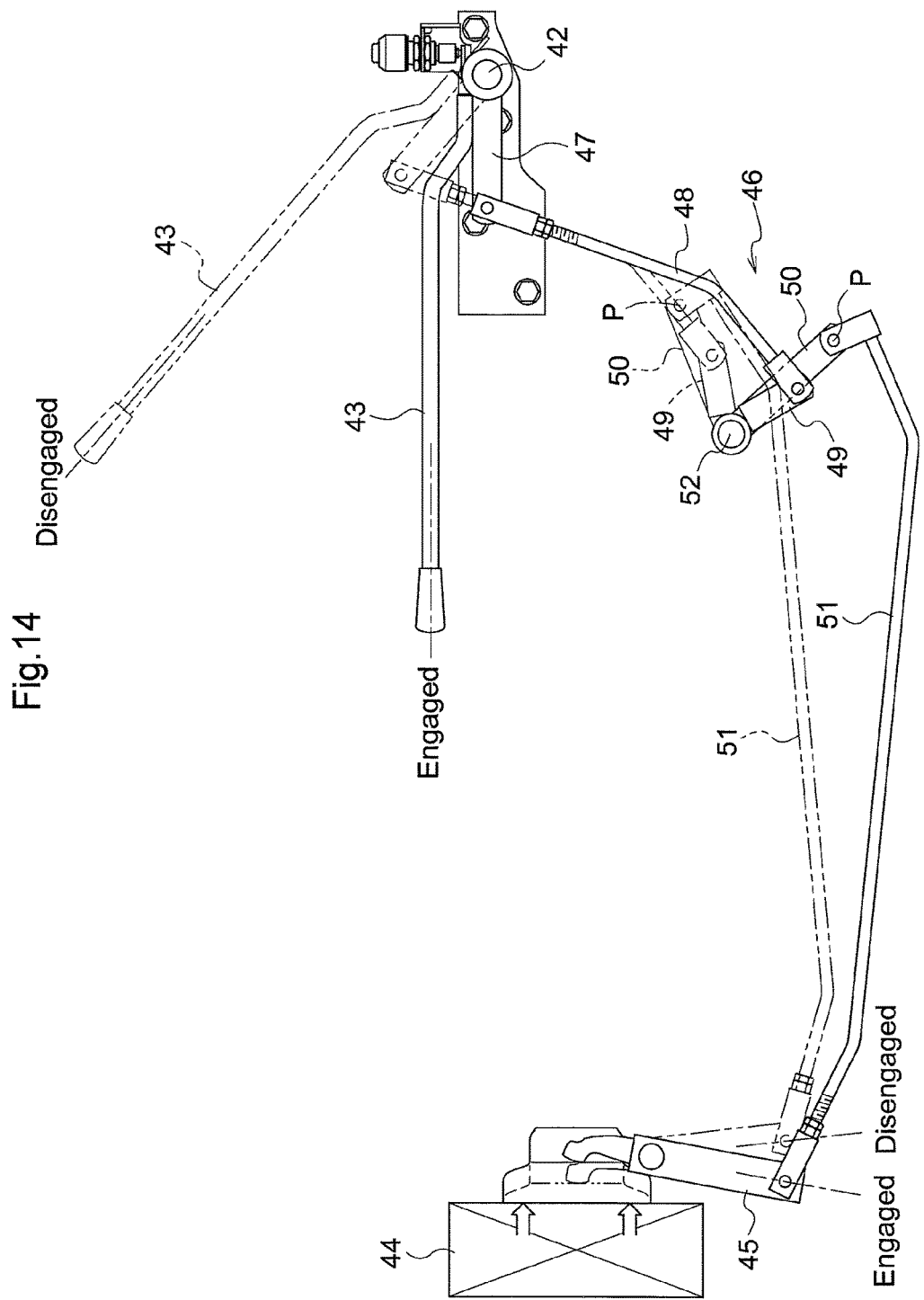
FIG. 14 is a linkage view showing an operational configuration of a PTO clutch.

As shown in FIG. 14, at a position on the left side of the driver's seat 14 in the riding driving section 3, a clutch lever 43 is disposed in the region forwardly of this pivot shaft 42 to be pivotally operable between a lower clutch-engaged position and an upper clutch-disengaged position about a right-left oriented support shaft 42. The clutch lever 43 is operably coupled, via a mechanical link mechanism 46 for implement power transmission/non-transmission, to a release fork 45 for implement power transmission/non-transmission provided in an independent type dual clutch 44 incorporated in the housing unit 10. The dual clutch 44 is configured to return, by the action of an implement engagement urging spring (not shown) incorporated therein, from the implement power non-transmission state in which the implement power transmission/non-transmission release fork 45 is located at a rearward clutch disengaged position to an implement power transmission state in which the implement power transmission/non-transmission release fork 45 is located at a forward clutch engaged position.

The mechanical link mechanism 46 for implement power transmission/non-transmission includes an operational arm 47, a first link rod 48, a short first arm 49, a long second arm 50, a second link rod 51 and on. The operational arm 47 is pivoted about the pivot shaft 42 in unison with the clutch lever 43 in the region forwardly of this pivot shaft 42. The first link rod 48 has one end portion thereof pin-connected to a free end portion of the operational arm 47, and the other end portion thereof pin-connected to a free end portion of the first arm 49. The first arm 49 and the second arm 50 are pivoted together about a right-left oriented pivot shaft 52 disposed forwardly and downwardly of the pivot shaft 42, along the vertical direction in a region rearwardly of this pivot shaft 52. The second coupling rod 51 is formed in an elastically deformable bent shape and has its one end portion pin-connected to a free end portion of the second arm 50 and its other end portion pin-connected to the release fork 45. And, in operation of the second coupling rod 51, when the clutch lever 43 is located at the downward clutch engaged position, a connection point P between the second arm 50 and the second coupling rod 51 is located downwardly of a dead point against the action of the engagement urging spring for implement. Whereas, when the clutch lever 43 is located at the upward clutch disengaged position, the connecting point P is disposed upwardly of the dead point. Further, when the clutch lever 43 is located at the downward clutch engaged position, the implement power transmission/non-transmission release fork 45 is set to be located at a forward clutch engaged position. When the clutch lever 43 has approached the upward clutch disengaged position and the connecting point P has moved to the vicinity of the lower side of the dead point, the release fork 45 is set to be located at a rearward clutch disengaged position.

With the above-described arrangement, under the state of the clutch lever 43 being located at the downward clutch engaged position, due to the action of the engagement urging spring for implement, the dual clutch 44 can be retained under the implement power transmission state where the implement power transmission/non-transmission release fork 45 is located at the forward clutch engaged position. And, if the clutch lever 43 currently located at this clutch engaging position is now pivoted toward the upward clutch disengaging position against the action of the implement engagement urging spring, in response to this operation, the implement power transmission/non-transmission release fork 45 will reach the clutch disengaging position, thus switching the dual clutch 44 into the implement power non-transmission state, upon approaching of the connection point P between the second arm 50 and the second coupling rod 51 to the lower side of the dead point as described above. Thereafter, if the clutch lever 43 is pivoted further upwards, the second coupling rod 51 will be elastically deformed to allow the connecting point P to go past the dead point, thus allowing the clutch lever 43 to reach the clutch disengaging position and also the second coupling rod 51 will be return to its original shape. With this, due to the action of the implement engagement urging spring, the clutch lever 43 can be retained at the upward clutch disengaging position and also the dual clutch 44 can be retained under the implement power non-transmission state wherein the implement power transmission/non-transmission release fork 45 is located at the rearward clutch disengaging position. Now, if the clutch lever 43 currently located at this clutch disengaging position is pivoted toward the downward clutch engaging position, the second coupling rod 51 will be elastically deformed to allow the connecting point P to go past the dead point to be moved to the lower side of this dead point. And, when the connecting point P has moved to the lower side of the dead point, the second coupling rod 51 will be return to its original shape. Thereafter, in association with arrival of the clutch lever 43 at the clutch disengaging position, the implement power transmission/non-transmission release fork 45 will arrive at the forward clutch engaging position, thus switching the dual clutch 44 over to the implement power transmission state. With this, due to the action of the implement engagement urging spring, the dual clutch 44 can be retained under the implement power transmission state wherein the implement power transmission/non-transmission release fork 45 is located at the forward clutch engaging position.

That is, in response to switchover operations beyond the dead point with utilization of elastic deformation of the second coupling rod 51, due to the action of the implement engagement urging spring incorporated in the dual clutch 44, the dual clutch 44 can be selectively retained under the implement power transmission state wherein the implement power transmission/non-transmission release fork 45 is located at the forward clutch engaging position and under the implement power non-transmission state wherein the implement power transmission/non-transmission release fork 45 is located at the rearward clutch disengaging position, and also the clutch lever 43 can be selectively retained at the downward clutch engaging position or the upward clutch disengaging position.

Though not shown, the clutch lever 43 and the implement power transmission/non-transmission mechanical link mechanism 46 can be alternatively configured such that the clutch 43 is selectively retained to an upward clutch engaging position or to a downward clutch disengaging position, by switchover operation beyond the dead point utilizing the elastic deformation of the second coupling rod 51.

Though not shown, the dual clutch 44 operatively links its traveling power transmission/non-transmission release fork to the clutch pedal 30 via a traveling power transmission/non-transmission mechanical link mechanism. And, with this operative linkage, under the step-on released state in which a step-on operation on the clutch pedal 30 is released, due to the action of a traveling engagement urging spring (not shown) incorporated in the dual clutch 44, the clutch pedal 30 can be retained to the clutch engaging position and also the dual clutch 44 can be retained to a traveling power transmission state wherein the traveling power transmission/non-transmission release fork is located at a forward clutch engaging position. And, when a step-on operation on the clutch pedal 30 for switchover from the clutch engaging position to the clutch disengaging position is effected against the action of the traveling engagement urging spring, in association with arrival of the clutch pedal 30 at the clutch disengaging position, the dual clutch 44 can be switched over to the traveling power non-transmission state wherein the traveling power transmission/non-transmission release fork is located at a rearward clutch disengaging position. Thereafter, upon release of the step-on operation on the clutch pedal 30, due to the action of the traveling engagement urging spring, the clutch pedal 30 can be returned to the clutch engaging position from the clutch disengaging position and retained at this clutch engaging position, and also the dual clutch 44 can be retained to the traveling power transmission state wherein the traveling power transmission/non-transmission release fork is located at the forward clutch engaging position.

Though not shown, the housing unit 10 includes a gear type main speed changer device and a gear type auxiliary speed changer device for speed-changing traveling power from the engine 9 via the dual clutch 44, and so on.

Figure 15:
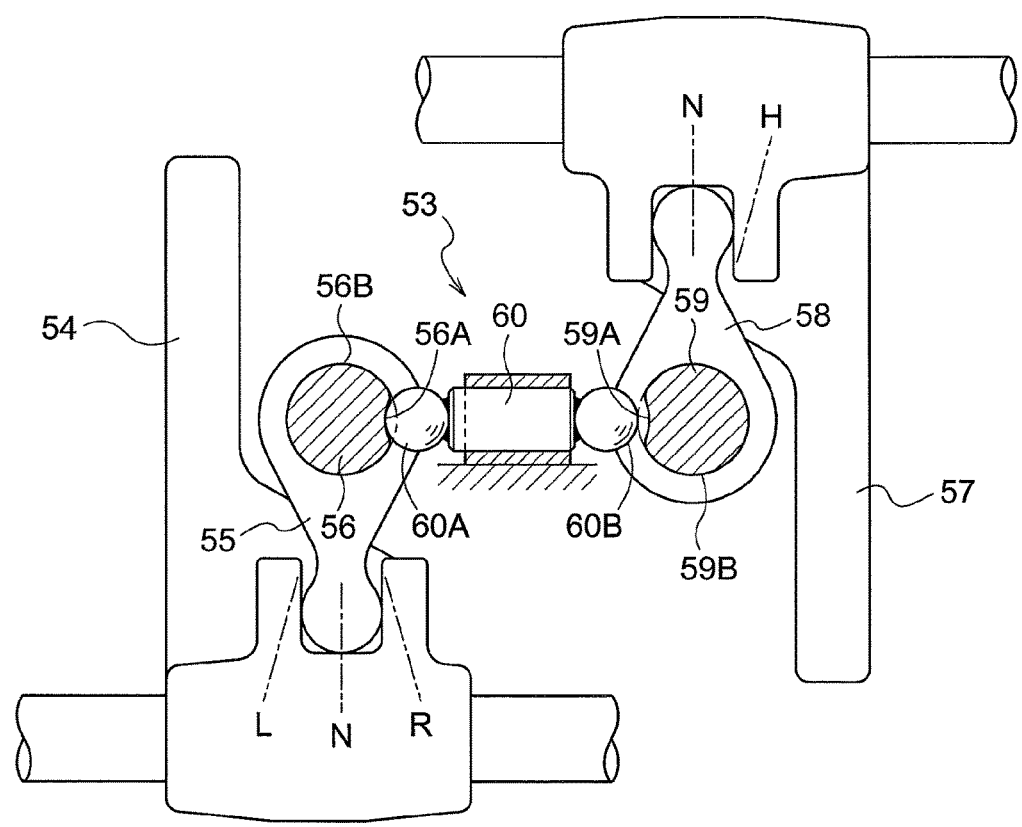
FIG. 15 is a plan view in vertical section of principal portions showing a configuration of an interlock mechanism.
Figure 16:
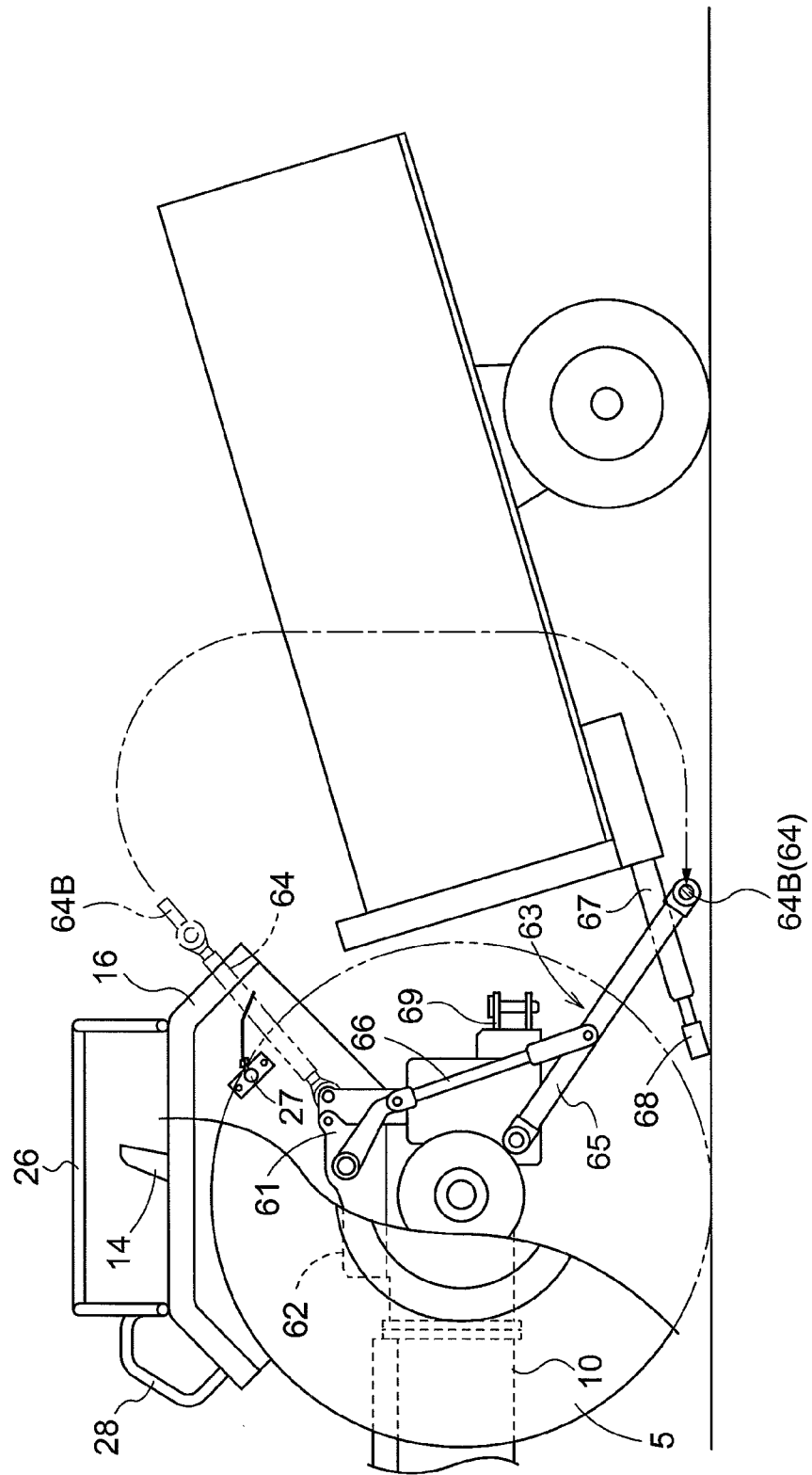
FIG. 16 is a left side view partially in vertical section of principal portions showing a connection start state of a trailer connection operational configuration using a top link.
Figure 17:
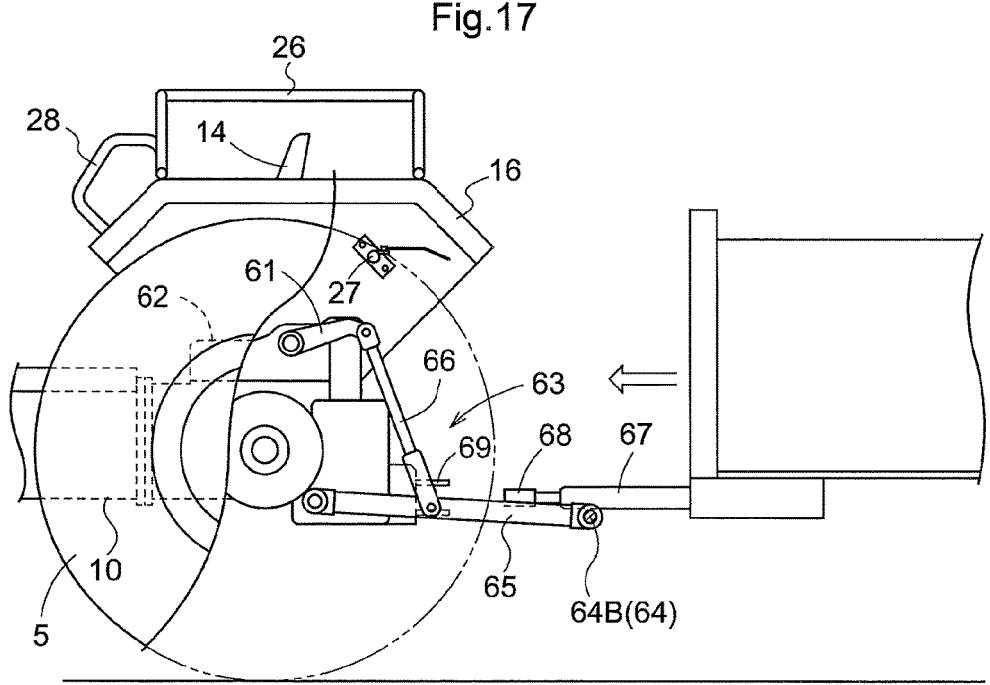
FIG. 17 is a left side view partially in vertical section of principal portions showing a connection intermediate state of the trailer connection operational configuration using the top link.
Figure 18:
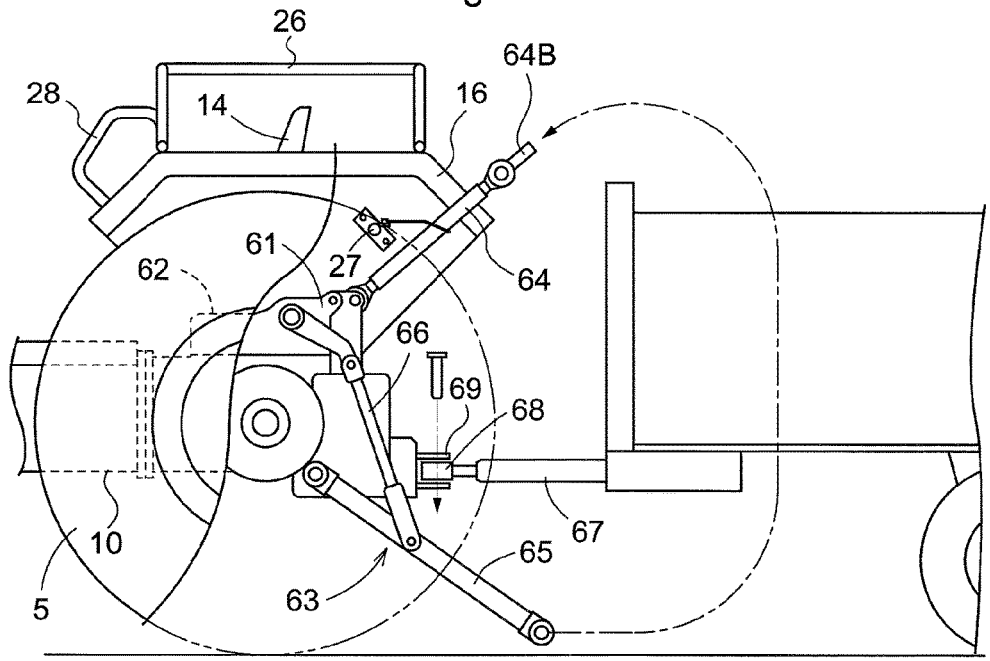
FIG. 18 is a left side view partially in vertical section of principal portions showing a connection completed state of the trailer connection operational configuration using the top link.

As shown in FIG. 15, outside the housing unit 10, there is provided an interlock mechanism 53 for preventing occurrence of double-meshing state in the auxiliary speed changer device. The interlock mechanism 53 includes a pivot shaft 56 of a first pivot arm 55 for sliding a first shift fork 54 of the auxiliary speed changer device between a reverse traveling position and a low-speed forward traveling position across a neutral position therebetween, a pivot shaft 59 of a second pivot arm 58 for sliding a second shift fork 57 of the auxiliary speed changer device between the neutral position and a high-speed forward traveling position, a restraining member 60 disposed between the above pivot shafts 56, 59, and so on. The respective pivot shafts 56, 59 include recesses 56A, 59A which are formed to face each other under the neutral state of the auxiliary speed changer device wherein each of the first shift fork 54 and the second shift fork 57 is located at the neutral position. The restraining member 60 is disposed such that ball portions 60A, 60B at the opposed ends thereof face the recess formed portions of the pivot shafts 56, 59, respectively. And, under the neutral state of the auxiliary speed changer device, the restraining member 60 is located between the recesses 56A, 59A of the respective pivot shafts 56, 59 with forming a predetermined gap therebetween, thereby to allow sliding displacement of the first shift fork 54 or the second shift fork 57 from the neutral position to other operational position. Further, when the first shift fork 54 is located at the reverse traveling position or the low-speed forward traveling position, the restraining member 60 restrains sliding displacement of the second shift fork 57 from the neutral position to the high-speed forward traveling position as one ball portion 60A thereof comes into contact with a circumferential portion 56B in the pivot shaft 56 of the first pivot arm 55 and also the other ball portion 60B thereof comes into contact with the recess 59A in the pivot shaft 59 of the second pivot arm 58. Conversely, when the second shift fork 57 is located at the high-speed forward traveling position, the restraining member 60 restrains sliding displacement of the first shift fork 54 from the neutral position to the reverse traveling position or the low-speed forward traveling position as other ball portion 60B thereof comes into contact with a circumferential portion 59B in the pivot shaft 59 of the second pivot arm 58 and also the one ball portion 60A thereof comes into contact with the recess 56A in the pivot shaft 56 of the first pivot arm 55.

Namely, by disposing the interlock mechanism 53 outside the housing unit 10, compared with a case of disposing this mechanism 53 inside the housing unit 10, readiness of assembly and readiness of maintenance etc. of the interlock mechanism 53 are enhanced and at the same time occurrence of double-meshing condition in the auxiliary speed changer device can be prevented.

Though not shown, the interlock mechanism 53 can be alternatively configured such that groove portions or chamfered portions, instead of the recesses 56A, 59A, are formed in the respective pivot shafts 56, 59.

As shown in FIG. 2 and FIGS. 16-18, at a rear end portion of the housing unit 10, there are mounted a pair of right and left lift arms 61 that allow elevating/lowering operations of an implement such as a rotary cultivator or a plow (not shown) to be connected to a rear portion of the tractor, a hydraulic lift cylinder 62 vertically pivotally driving the right and left lift arms 61, a three-point link mechanism 63 that allows connection of the implement such as a rotary cultivator to the rear portion of the tractor, and so on. The three-point link mechanism 63 includes a single top link 64 and right and left lower links 65, and the right and left lower links 65 are vertically pivotally drivably to the corresponding lift arms 61 via a lift rod 66. The top link 64 includes, at its opposed end portions, connecting shafts 64B that allow connection between ball joints 64A and free end portions of the right and left lower links 65. The right and left lower link 65 include the ball joints 65A at the respective opposed end portions thereof.

With the above-described configuration, in case a trailer connecting hitch 69 is mounted to the rear end portion of the housing unit 10 and a towing ring 68 provided at the leading end of a towing arm 67 of the trailer (not shown) is to be pin-connected to this hitch 69, the top link 64 which is not used at the time of trailer towing will be dismounted from the rear end portion of the housing unit 10, and then passed under the towing arm 67 of the trailer and then the connecting shafts 64B at the opposed ends of the top link will be connected to the ball joints 65A at the free end portions of the right and left lower links 65. With this, in response to an operation of the lift cylinder 62 provided at the rear end portion of the housing unit 10, the trailer towing arm 67 can be elevated to a height position suitable for the pin connection between the towing ring 68 at its leading end and the hitch 69 at the rear end portion of the housing unit. Thereafter, the tractor will be caused to travel in reverse so as to align the front-rear position of the hitch 69 at the rear end portion of the housing unit with the front-rear position of the towing ring 68. Thus, the pin connection between the hitch 69 at the rear end portion of the housing unit and the towing ring 68 of the towing arm 67 is made possible.

Namely, as the top link 64 which is not used at the time of towing of the tractor is effectively utilized for the connection of the trailer, connection of the trailer to the hitch 69 provided at the rear end portion of the housing unit 10 can be facilitated.

INDUSTRIAL APPLICABILITY

The present invention is applicable to a work vehicle such as a tractor, a riding grass mower, a riding rice planter, etc., including right and left fenders, each the fenders having a vertical plate member that covers an inner face of a traveling device from an inner side of a vehicle body, and a top plate member that covers an upper portion of the traveling device from above.

The present invention is applicable to a work vehicle such as a tractor, a riding grass mower, a riding rice planter, and a wheel loader, etc.

DESCRIPTION OF REFERENCE MARKS/NUMERALS 5 traveling device
16 fender
17 support bracket
17Ba connecting portion (for left side)
17Bb connecting portion (for right side)
18 vertical plate member
19 top plate member
23 front side cover member
24 connecting arm
vehicle body frame
11 steering frame
14 driver's seat
29 operational pedal
29a step-on face
30 operational pedal
30a step-on face
31 vibration-isolating member
34 lower cover
35 footrest member
35a footrest face
35B accommodating portion

What is claimed is:

1. A work vehicle including right and left fenders, each of the fenders comprising a vertical plate member positioned between an inner face of a traveling device and an inner side of a vehicle body, and a top plate member that covers an upper portion of the traveling device from above; and
   a support bracket for supporting the vertical plate member, the support bracket being a right-left interchangeable member having a front-rear symmetric shape,
   wherein the top plate member is configured to be front-rear symmetric, and each of the vertical plate member and the top plate member is configured to act as a right-left interchangeable member,
   wherein each of the right and left fenders includes a front side cover member for covering a front side of the traveling device; and the front side cover member is configured to act as a right-left interchangeable member having a vertically symmetric shape, and
   wherein the support bracket includes, in a front-rear symmetric layout, a left connecting portion for disposing the vertical plate member with an offset to one front/rear side relative to a front-rear center of the support bracket, and a right connecting portion for disposing the vertical plate member with an offset to the other front/rear side relative to the front-rear center of the support bracket.

2. The work vehicle according to claim 1, wherein the vertical plate member has a front-rear symmetric shape.

3. The work vehicle according to claim 1, wherein the vertical plate member has a right-left symmetric shape.

4. A work vehicle including right and left fenders, each of the fenders comprising a vertical plate member positioned between an inner face of a traveling device and an inner side of a vehicle body, and a top plate member that covers an upper portion of the traveling device from above; and
   a support bracket for supporting the vertical plate member, the support bracket being a right-left interchangeable member having a front-rear symmetric shape,
   wherein the top plate member is configured to be front-rear symmetric, and each of the vertical plate member and the top plate member is configured to act as a right-left interchangeable member,
   wherein each of the right and left fenders includes a front side cover member for covering a front side of the traveling device; and the front side cover member is configured to act as a right-left interchangeable member having a vertically symmetric shape,
   wherein the top plate member includes a connecting arm to be connected to the support bracket; and
   wherein the vertical plate member and the connecting arm are connected and fastened together to the support bracket.

5. A work vehicle comprising:
   a steering frame disposed erect at a position in a vehicle body frame which position is forwardly of a driver's seat; and
   a lower cover to be attached to the steering frame for covering the steering frame from behind;
   wherein the lower cover includes a footrest member to be used by a driver seated in the driver's seat, wherein the work vehicle further comprises an operational pedal that is provided on a lateral side of the steering frame, and wherein the footrest member is configured such that a height position of a footrest face thereof is higher than a height position of a step-on face of the operational pedal, and a rear end position of the footrest face is located more rearward than a rear end position of the step-on face.

6. The work vehicle according to claim 5, wherein the footrest member is disposed at right-left center of the lower cover.

7. The work vehicle according to claim 5, wherein the footrest member includes an accommodating portion under a footrest face thereof.

8. The work vehicle according to claim 5, wherein the footrest member is configured such that a height position of its footrest face is higher than a height position of a step-on face of an operational pedal which is disposed laterally of the steering frame.

9. The work vehicle according to claim 5, wherein the steering frame is disposed erect on the vehicle body frame via a vibration-isolating member.

10. A work vehicle comprising right and left fenders, each of the fenders having a vertical plate member that covers an inner face of a traveling device from an inner side of a vehicle body, and a top plate member that covers an upper portion of the traveling device from above; wherein the top plate member is configured to be front-rear symmetric, and each of the vertical plate member and the top plate member are configured to act as a right-left interchangeable member;

wherein the work vehicle further comprises a support bracket for supporting the vertical plate member, the support bracket being a right-left interchangeable member having a front-rear symmetric shape; and wherein the support bracket includes, in front-rear symmetric layout, a left connecting portion for disposing the vertical plate member with an offset to one front/rear side relative to a front-rear center of the support bracket, and a right connecting portion for disposing the vertical plate member with an offset to the other front/rear side relative to the front-rear center of the support bracket.

11. A work vehicle comprising right and left fenders, each of the fenders having a vertical plate member that covers an inner face of a traveling device from an inner side of a vehicle body, and a top plate member that covers an upper portion of the traveling device from above; wherein the top plate member is configured to be front-rear symmetric, and each of the vertical plate member and the top plate member are configured to act as a right-left interchangeable member;

wherein the work vehicle further comprises a support bracket for supporting the vertical plate member, the support bracket being a right-left interchangeable member having a front-rear symmetric shape; and wherein the top plate member includes a connecting arm to be connected to the support bracket; and the vertical plate member and the connecting arm are connected and fastened together to the support bracket.

* * * * *